(12) United States Patent
Li

(10) Patent No.: US 12,723,889 B2
(45) Date of Patent: Sep. 1, 2026

(54) METHOD AND APPARATUS FOR UPDATING ASSOCIATED INFORMATION OF GUIDE POINT

(71) Applicant: Tencent Technology (Shenzhen) Company Limited, Shenzhen (CN)

(72) Inventor: Yang Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 283 days.

(21) Appl. No.: 18/203,522

(22) Filed: May 30, 2023

(65) Prior Publication Data

US 2024/0192015 A1 Jun. 13, 2024

Related U.S. Application Data

(63) Continuation of application No. PCT/CN2022/137391, filed on Dec. 8, 2022.

(30) Foreign Application Priority Data

Mar. 16, 2022 (CN) ........................ 202210255926.X

(51) Int. Cl.
*G01C 21/00* (2006.01)

(52) U.S. Cl.
CPC ................................ *G01C 21/3811* (2020.08)

(58) Field of Classification Search
CPC . G01C 21/3811; G06F 16/23; G06F 16/2458; G06F 16/29
See application file for complete search history.

(56) References Cited

U.S. PATENT DOCUMENTS

2006/0009906 A1* 1/2006 Hellmich ............... G01C 21/26 701/1
2010/0235083 A1 9/2010 Takahata et al.
(Continued)

FOREIGN PATENT DOCUMENTS

CN 101578500 A 11/2009
CN 104101354 A 10/2014
(Continued)

OTHER PUBLICATIONS

Tencent Technology, ISR, PCT/CN2022/137391, Feb. 16, 2023, 3 pgs.
(Continued)

*Primary Examiner* — Abby J Flynn
*Assistant Examiner* — Matthew John Moscola
(74) *Attorney, Agent, or Firm* — Morgan, Lewis & Bockius LLP

(57) ABSTRACT

This application discloses a method for updating associated information of a guide point performed by a computer device. The method includes: acquiring a first road sign corresponding to a target guide point; acquiring a first update time having a corresponding relationship with the first road sign from a road change time library under a condition that the first road sign is found in the preset road change time library; determining a set of after-change road signs associated with the first update time and the first road sign in a preset road change relationship library; and updating the first road sign corresponding to the target guide point according to the set of after-change road signs. This embodiment of this application can be applied to the fields of maps, traffic, etc.

17 Claims, 15 Drawing Sheets

(56) References Cited

U.S. PATENT DOCUMENTS

| | | | | |
|---|---|---|---|---|
| 2011/0055348 | A1* | 3/2011 | Black | H04M 3/42348 707/E17.014 |
| 2017/0205242 | A1 | 7/2017 | Schmidt et al. | |
| 2021/0270977 | A1* | 9/2021 | Nie | H04W 4/44 |
| 2023/0135512 | A1* | 5/2023 | Xu | G06T 5/70 348/148 |

FOREIGN PATENT DOCUMENTS

| | | | |
|---|---|---|---|
| CN | 106557474 | A | 4/2017 |
| CN | 107883974 | A | 4/2018 |
| CN | 111427976 | A | 7/2020 |
| CN | 112444254 | A | 3/2021 |
| CN | 112486817 | A | 3/2021 |
| CN | 114003672 | A | 2/2022 |
| CN | 114356951 | A | 4/2022 |
| WO | WO 2016078608 | A1 | 5/2016 |

OTHER PUBLICATIONS

Tencent Technology, Extended European Search Report, EP Patent Application No. 22931842.3, 25JUN2025, 13 pgs.

* cited by examiner

| Road change time library | |
|---|---|
| KEY | VALUE |
| January 1 | Road A |
| January 1 | Road B |
| January 2 | Road A |

| Road change relationship library | |
|---|---|
| KEY | VALUE |
| January 1, road A | Road C |
| January 1, road B | Road D |
| January 2, road C | Road E |

| Road change time library | |
|---|---|
| Update time | Before-change road sign |
| January 1 | Road A |
| January 1 | Road B |
| January 2 | Road C |

Current update time

Current before-change sign

One update time later than the current update time

Before-change signs in the next round of iterative search operation

| Road change time library | |
|---|---|
| Update time | Before-change road sign |
| T1 | Road A |
| | |
| T2 | Road C |
| T2 | Road D |
| T3 | Road A |
| T3 | Road E |

| Road change relationship library | |
|---|---|
| Update time, before-change road sign | After-change road sign |
| T1, road A | Road B |
| T1, road A | Road C |
| T2, Road B | Road E |
| T2, Road C | Road A |
| T3, road A | Road A |
| T3, Road E | Road A |

[Scene 1: Basic inheritance] One-to-one id change, one-to-many id change and many-to-one id change occur at a single time point

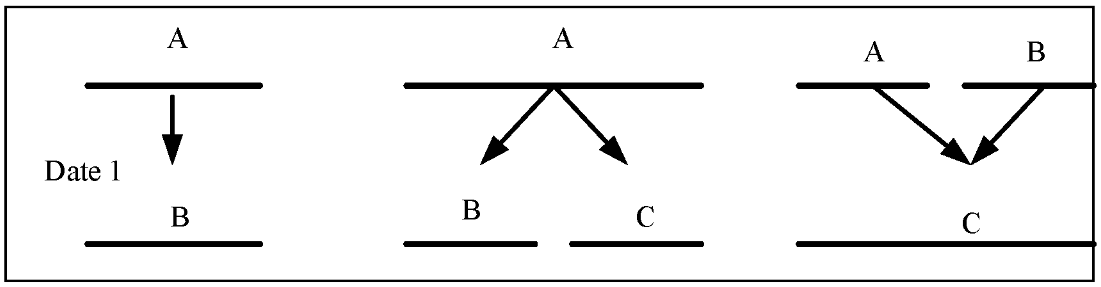

[Scene 2: Basic self inheritance] On the basis of basic inheritance, the same id appears before and after the inheritance relationship chain

[Scene 3: Multi-level inheritance] One inheritance relationship chain spans a plurality of time points and may include the scene 1 and the scene 2 at the same time, and it is the most complex inheritance relationship

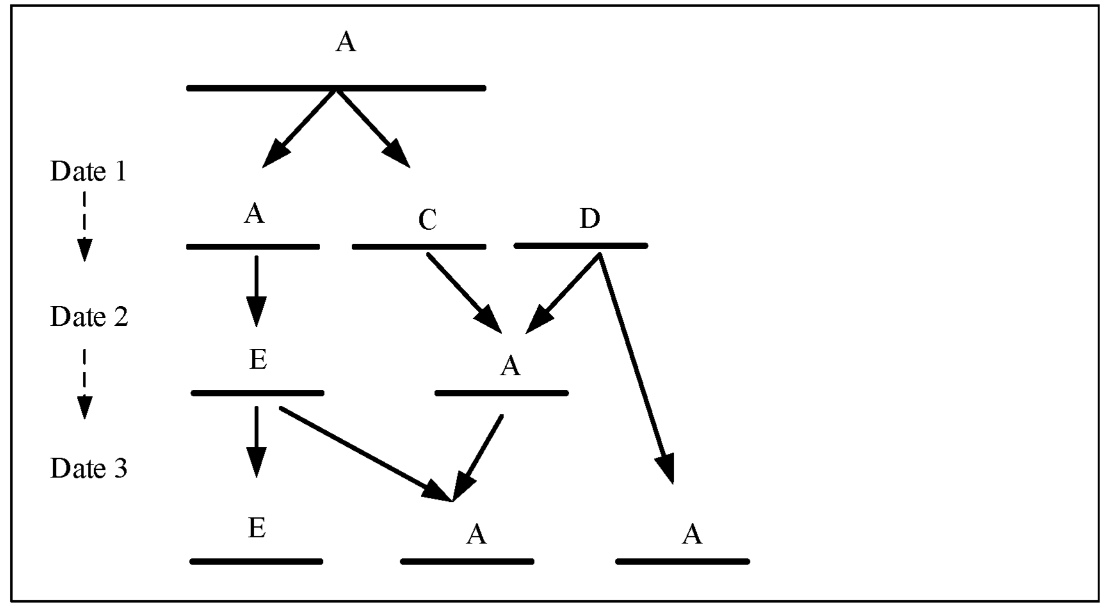

FIG. 14

METHOD AND APPARATUS FOR UPDATING ASSOCIATED INFORMATION OF GUIDE POINT

CROSS-REFERENCE TO RELATED APPLICATIONS

This application is a continuation application of PCT Patent Application No. PCT/CN2022/137391, entitled "METHOD AND APPARATUS FOR UPDATING ASSOCIATED INFORMATION OF GUIDE POINT" filed on Dec. 8, 2022, which claims priority to Chinese Patent Application 202210255926.X, entitled "METHOD AND APPARATUS FOR UPDATING ASSOCIATED INFORMATION OF GUIDE POINT" filed with the Chinese Patent Office on Mar. 16, 2022, all of which is incorporated herein by reference in its entirety.

FIELD OF THE TECHNOLOGY

This application relates to the field of computers, and particularly relates to a method and apparatus for updating associated information of a guide point.

BACKGROUND OF THE DISCLOSURE

In a geographic information system, the location of a road is generally described through road signs and various detailed attributes. The road is a carrier of guide points, and the guide point must be made on a correct road. If the road sign is updated, and the guide point is failed to be adaptively updated, an online navigation strategy will not be able to acquire corresponding road information through the invalid road sign. If the road sign is invalid or road coordinates have changed, the guide point can only be updated by finding a new road nearby based on initial coordinates of the guide point. However, in the solution above, if surrounding road network of initial coordinates of the guide point is significantly changed, there will be a high risk, and it is difficult to meet the actual needs of users, resulting in a technical problem of low updating accuracy of the guide point in related technologies.

There are no effective solutions proposed to solve the problems above.

SUMMARY

An embodiment of this application provides a method and an apparatus for updating associated information of a guide point, a storage medium, an electronic device and a computer program product.

A method for updating associated information of the guide point is executed by the computer device and the method includes: acquiring a first road sign corresponding to a target guide point, the first road sign being a road sign of a first road with the target guide point; acquiring a first update time having a corresponding relationship with the first road sign from a road change time library, and the first update time being an earliest update time having a corresponding relationship with the first road sign in the road change time library; determining a set of after-change road signs associated with the first update time and the first road sign in a preset road change relationship library, a plurality of sets of update times, before-change road signs and after-change road signs which have a corresponding relationship being recorded in the road change relationship library, the update time in the road change relationship library being the time at which a road corresponding to the before-change road sign is changed to obtain a road corresponding to the after-change road sign, the before-change road sign being configured to represent a before-change road, and the after-change road sign being configured to represent an after-change road; and updating the first road sign corresponding to the target guide point according to the set of after-change road signs.

A non-transitory computer readable storage medium stores a computer program; and the computer program is executed by one or more processors of an electronic device, and causes the electronic device to execute the method for updating associated information of the guide point.

An electronic device includes a memory and a processor; the memory stores a computer program that, when executed by the processor, causes the electronic device to perform the method for updating associated information of the guide point through the computer program.

BRIEF DESCRIPTION OF THE DRAWINGS

FIG. 14 is a schematic diagram of another exemplary method for updating associated information of a guide point according to an embodiment of this application;

DESCRIPTION OF EMBODIMENTS

In the specification, claims, and the foregoing accompanying drawings of this application, the terms "first", "second", and so on are intended to distinguish between similar objects rather than indicating a specific order. It is to be understood that data used in this way is exchangeable in a proper case, so that the embodiments of this application described herein can be implemented in an order different from the order shown or described herein. Moreover, the terms "include", "contain" and any other variants mean to cover the non-exclusive inclusion, for example, a process, method, system, product, or server that includes a list of steps or units is not necessarily limited to those expressly listed steps or units, but may include other steps or units not expressly listed or inherent to such a process, method, system, product, or device.

Firstly, some terms or phrases used in the description of the embodiments of this application are applicable to the following interpretations:

POI: Point of Interest in a geographic information system can be a house, a shop, a mailbox, a bus station and the like. Core attributes for describing the POI include a name, an address, coordinates (longitude and latitude), current situation (whether it is in an in-service state, an accessible state or an available state) and a guide point (end point information of a planned route, for example, the guide point of a building includes a northeast entrance and a parking lot entrance).

Guide point: it refers to a position point having certain specific functions on a road, for example, the guide point can be a guide prompt point set for reminding a user of driving information, specifically, the guide point may include but is not limited to a start point or an end point of the planned route, and the core attributes include a guide road id and guide coordinates.

Road: it is abstract of the road in the real world, and is generally described through the road id, a road shape (a coordinate point string) and various detail attributes (length, width, type and the like) in the geographic information system.

The road has two important service backgrounds:

(1) The road is crucial to the guide point, it is a carrier of the guide point, and the guide point is to be made on a correct road; and (2) Road data is changed and updated every day, and the specific representation forms include: addition, deletion, segmentation, merging, id inheritance, road shape change, change of detail attributes and the like. Each change may affect the guide point. The segmentation is to segment the road into two or more road sections; and the id inheritance refers to that the after-change road changed inherits the road sign of the before-change road.

Figure 1:
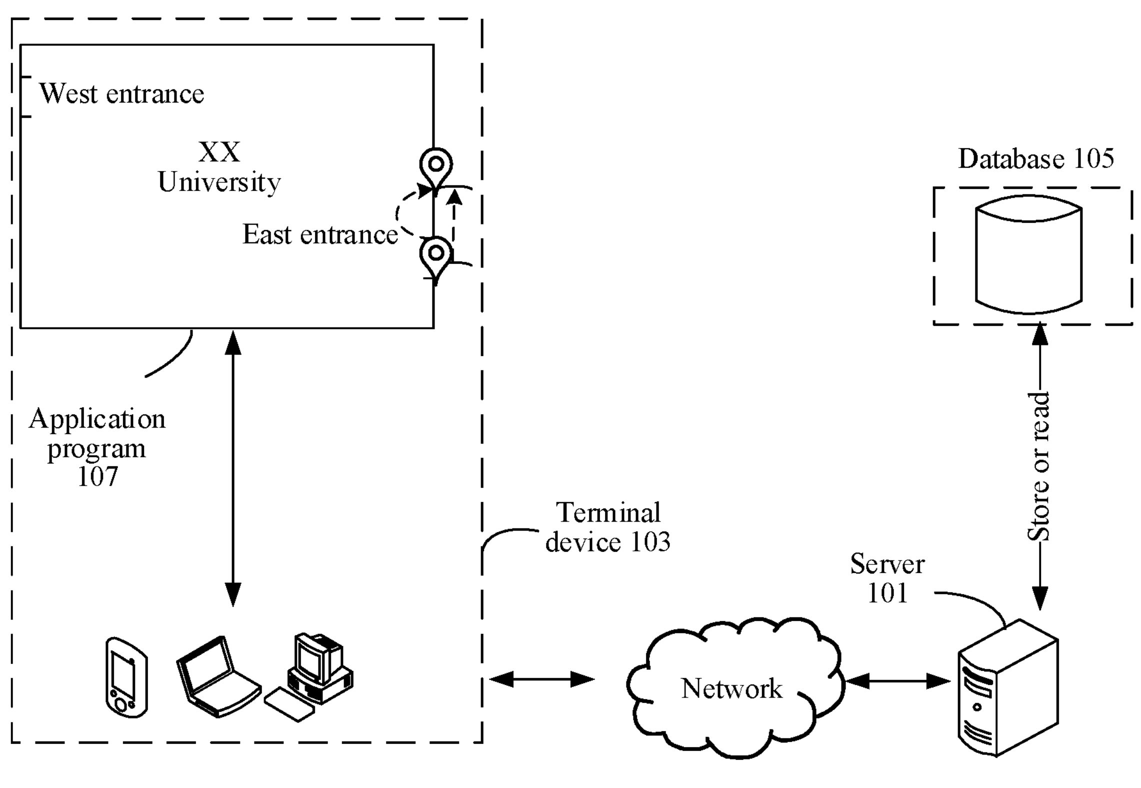
FIG. 1 is a schematic diagram of an application environment in which an exemplary method for updating associated information of a guide point is implemented according to an embodiment of this application.

This application is described in combination with the following embodiments:

In one aspect, an embodiment of this application provides a method for updating associated information of a guide point. In this embodiment, the method for updating associated information of the guide point can be applied to a hardware environment composed of a server 101 and a terminal device 103 as shown in FIG. 1. A terminal 102 and a server 104 can be independently configured to execute the method for updating associated information of the guide point provided by the embodiment of this application. The terminal 102 and the server 104 can also be cooperatively configured to execute the method for updating associated information of the guide point provided by the embodiment of this application. That the server 102 and the server 104 are cooperated to execute the method for updating associated information of the guide point provided by the embodiment of this application is as an example for illustrating, as shown in FIG. 1, the server 101 is connected to the terminal 103 through a network and can be configured to provide services for the terminal device or application programs installed in the terminal device, and the application programs can be video application programs, instant messaging application programs, browser application programs, education application programs, game application programs, map application programs and the like. A database 105 can be installed in the server or independent of the server and is configured to provide data storage services for the server 101, such as a map data storage server; the network can include but is not limited to a wired network and a wireless network; the wired network includes a local area network, a metropolitan area network and a wide area network; the wireless network includes Bluetooth, WIFI and other networks for realizing wireless communication; the terminal device 103 can be a terminal configured with the application programs and can include but is not limited to at least one of the following computer devices: a mobile phone (such as an Android phone, and an iOS phone), a notebook computer, a tablet personal computer, a pocket computer, an MID (Mobile Internet Devices), a PAD, a desktop computer, a smart computer, a vehicle-mounted device, a portable device, an aircraft and the like; the server can be a single server, can also be a server cluster composed of a plurality of servers, or can be a cloud server; and the application programs 107 using the method for updating associated information of the guide point are displayed through the terminal device 103 or other connected display devices.

It is to be understood easily that the method for updating associated information of the guide point provided by this application can be applied to the computer device, and the computer device can be the terminal or the server as shown in FIG. 1. For example, as shown in FIG. 1, the method for updating associated information of the guide point can be implemented through terminal device 103 by the following steps:

S1, Acquire a first road sign corresponding to a target guide point from the terminal device 103, the first road sign being a road sign of a first road with the target guide point.

S2, Acquire a first update time having a corresponding relationship with the first road sign from a road change time library in the terminal device 103 under a condition that the first road sign is found in the preset road change time library, a plurality of sets of update times and road signs which have a corresponding relationship being recorded in the road change time library, the road signs in the road change time library being configured to represent roads with changes, the update time in the road change time library being the time at which the roads represented by the road signs having a corresponding relationship are changed, and the first update time being the earliest update time in the update times having a corresponding relationship with the first road sign in the road change time library.

S3, Determine a set of after-change road signs associated with the first update time and the first road sign in a preset road change relationship library in the terminal device 103, a plurality of sets of update times, before-change road signs and after-change road signs which have a corresponding relationship being recorded in the road change relationship library, the update time in the road change relationship library being the time at which a before-change road is changed to obtain an after-change road, the before-change road sign being configured to represent a before-change road, and the after-change road sign being configured to represent an after-change road.

S4, Update the first road sign corresponding to the target guide point in the terminal device 103 according to the set of after-change road signs.

In some embodiments, in one embodiment, the method for updating associated information of the guide point can also be implemented through the server, for example, the method can be implemented through the server 101 as shown in FIG. 1; or the method can be implemented by a user terminal and the server together.

The above is only an example, and this embodiment does not make specific limitation.

Figure 2:
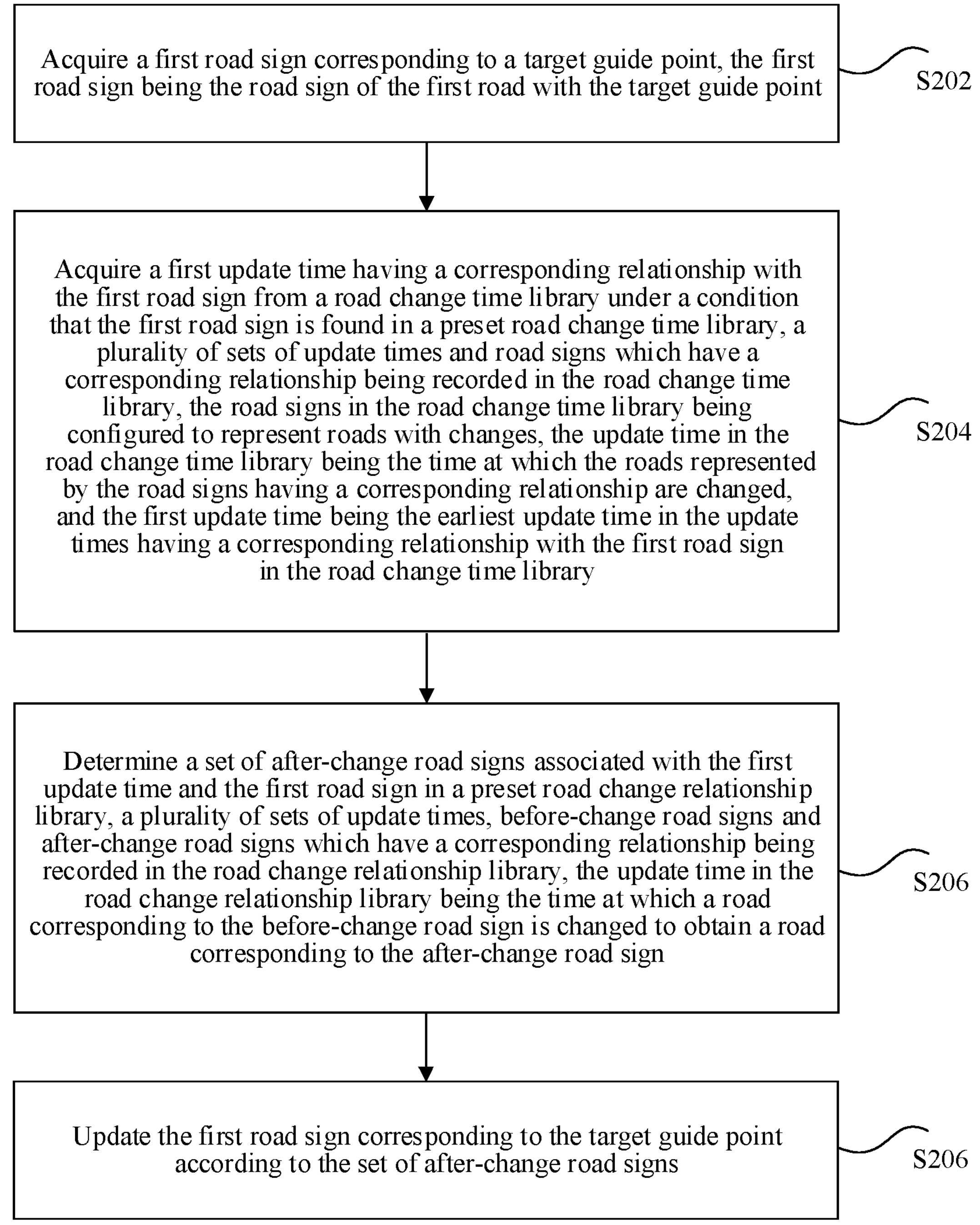
FIG. 2 is a flow schematic diagram of an exemplary method for updating associated information of a guide point according to an embodiment of this application.

In some embodiments, as an optional embodiment, as shown in FIG. 2, the method for updating associated information of the guide point includes:

S202, Acquire the first road sign corresponding to the target guide point, the first road sign being the road sign of the first road with the target guide point.

S204, Acquire the first update time having a corresponding relationship with the first road sign from the road change time library under the condition that the first road sign is found in the preset road change time library, the plurality of sets of update times and road signs which have a corresponding relationship being recorded in the road change time library, the road signs in the road change time library being configured to represent the roads with changes, the update time in the road change time library being the time at which the roads represented by the road signs having a corresponding relationship are changed, and the first update time being the earliest update time in the update times having a corresponding relationship with the first road sign in the road change time library.

S206, Determine a set of after-change road signs associated with the first update time and the first road sign in the preset road change relationship library, a plurality of sets of update times, before-change road signs and after-change road signs which have a corresponding relationship being recorded in the road change relationship library, the update time in the road change relationship library being the time at which the before-change road is changed to obtain the after-change road, the before-change road sign being configured to represent a before-change road, and the after-change road sign being configured to represent an after-change road.

S208, Update the first road sign corresponding to the target guide point according to the set of after-change road signs.

In some embodiments, in this embodiment, the method for updating associated information of the guide point can be applied to various scenes, including but not limited to scenes such as navigation and maps needing position information of the guide point.

For example, an intelligent traffic system (ITS) is also called an intelligent transportation system, and it is a comprehensive transportation system which effectively comprehensively applies the advanced scientific technologies (information technology, computer technology, data communication technology, sensor technology, electronic control technology, automatic control theory, operational research, artificial intelligence and the like) to transportation, service control and vehicle manufacturing to enhance the connection among vehicles, roads and users, and the system ensures safety, improves efficiency, improves environment and saves energy. Or, intelligent vehicle infrastructure cooperative systems are called IVICS for short and are a development direction of the ITS. The IVICS is a road traffic system which adopts advanced wireless communication, new-generation Internet and other technologies to comprehensively implement dynamic real-time information interaction between vehicles and between vehicles and roads, and carries out active safety control of the vehicles and cooperative management of the roads on the basis of full-time dynamic traffic information acquisition and fusion so as to fully realize effective cooperation of people, the vehicles and the roads, ensure traffic safety and improve traffic efficiency, and the road traffic system is safe, efficient and environment-friendly.

In some embodiments, in this embodiment, the target guide points can include but are not limited to one guide point corresponding to the POI and are configured to represent the position points having certain specific functions on the road, such as a start point or an end point of a navigation path or a certain point in the navigation path.

Facade: POI subject appearance, such as a tag, a shop front and a building body.

Bubble points: red points representing task coordinates in APP.

POI: a task name subject, such as a shop, a school, a bank, a community, a building and a parking lot.

Guide point: they are also called guide task bubble points. They are the position points having certain specific functions and distributed close to the road in front of the facade or at an entrance of a parking lot nearby.

Figures 3, 4:
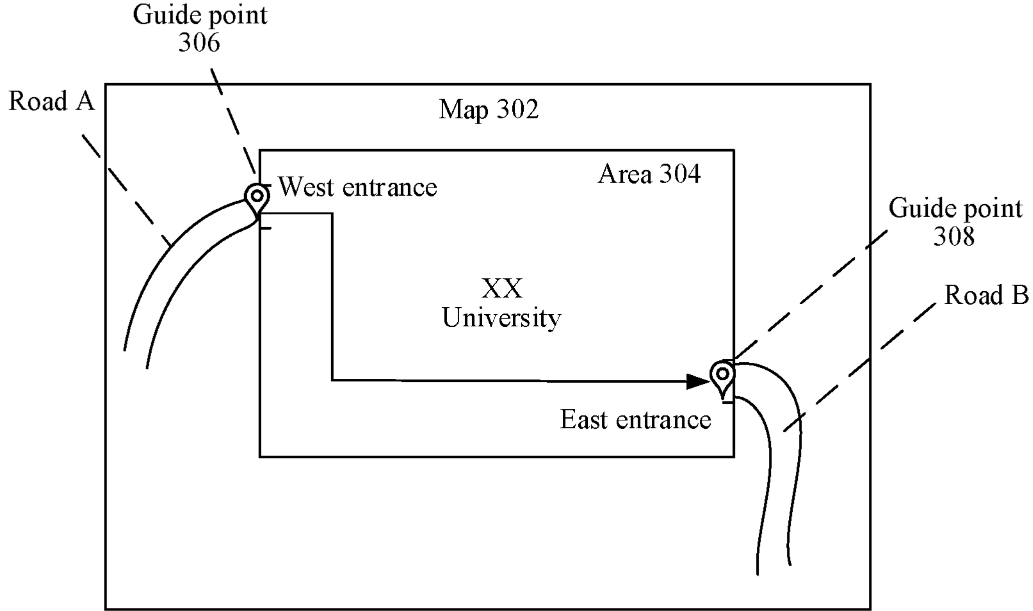
FIG. 3 is a schematic diagram of an exemplary method for updating associated information of a guide point according to an embodiment of this application.
FIG. 4 is a schematic diagram of another exemplary method for updating associated information of a guide point according to an embodiment of this application.

For example, that POI indicates an XX University is taken as an example, FIG. 3 is a schematic diagram of an exemplary method for updating associated information of a guide point according to an embodiment of this application; as shown in FIG. 3, the XX University is displayed as an area 304 in a map 302 and specifically includes a guide point 306 representing a west entrance of the XX University and a guide point 308 representing an east entrance of the XX University; if the user needs to navigate from the west entrance of the XX University to the east entrance of the XX University, a navigation path can be generated by taking the guide point 306 as the start point and the guide point 308 as the end point; the guide point 306 is at a road A, and the guide point 308 is at a road B; if the guide point 306 is the target guide point, the first road is the road A, and a first road sign is A; and if the guide point 308 is the target guide point, the first road is the road B, and the first road sign is B.

In some embodiments, in one embodiment, the first road with the target guide point can include but is not limited to be determined from the guide information of the target guide point, and the guide information includes traffic information close to the bubble points (corresponding to the guide points), such as relative road, name and coordinates. For example, after the target guide point is determined, the computer device will read the guide information of the target guide point from a cache according to the sign of the target guide point, extract the road sign from the guide information and take the extracted road sign as the first road sign.

In some embodiments, in one embodiment, the computer device can determine the current road with the target guide point, take the current road with the target guide point as the first road and take the road sign of the first road as the first road sign.

In some embodiments, in one embodiment, the road change time library can include but is not limited to a database which is stored in the server or the terminal device and records the plurality of sets of update times and road signs which have a corresponding relationship; the update time and the road sign in each set of update times and road signs in the plurality of sets of update times and road signs which have a corresponding relationship are in one-to-one correspondence; that is, each road sign in the plurality of sets of update times and road signs which have a corresponding relationship corresponds to at least one update time, and each update time also corresponds to at least one road sign; however, each set of data only includes one update time and one update sign, for example, if the road sign changed is the road A on January 1, one set of data in the road change time library will be "road A on January 1". The road change refers to that the road is subjected to change, and the specific change forms include road addition, road deletion, road segmentation, road merging, road id inheritance, road shape change, road detail attribute change and the like.

Specifically, the data in the road change time library can include but is not limited to be stored in a key-value form; and in the key-value form, key represents the road sign, and value represents the update time.

For example, FIG. 4 is a schematic diagram of another exemplary method for updating associated information of a guide point according to an embodiment of this application; as shown in the FIG. 4, key in the road change time library represents the road sign, value represents the update time, a first row of data indicates that the road A is changed on January 1, a second row of data indicates that the road B is changed on January 1, and a third row of data indicates that the road A is changed on January 2.

An update period of the data in the road change time library can be preset, and it can be configured to update every day, every week, every month, every quarter and the like, and can also be configured to be in a responsive updating mode; and as long as the road is updated, the corresponding record will be directly filled into the road change time library.

In some embodiments, in one embodiment, that the computer device searches the first road sign in the preset road change time library includes but is not limited to searching one or more corresponding update times from the key-value database by taking the first road sign as key; and in a case of a plurality of update times, the earliest update time is the first update time.

In some embodiments, in one embodiment, the road change relationship library can include but is not limited to a database which is stored in the server or the terminal device and records the plurality of sets of update times, before-change road signs and after-change road signs which have a corresponding relationship; each set of update times, before-change road signs and after-change road signs in the plurality of sets of update times, before-change road signs and after-change road signs which have a corresponding relationship are in one-to-one correspondence; that is, each update time in the plurality of sets of update times, before-change road signs and after-change road signs which have a corresponding relationship corresponds to at least one before-change road sign and at least one after-change road sign; each before-change road sign also corresponds to at least one update time and at least one after-change road sign; each after-change road sign also corresponds to at least one update time and at least one before-change road sign; however, each set of data only includes one update time, one before-change road sign and one after-change road sign, for example, one set of data in the road change relationship library can be: on January 1, the before-change road sign is the road A, and the after-change road sign is the road B.

Specifically, the data in the road change relationship library can include but is not limited to be stored in a key-value form; and in the key-value form, key represents the combination of the update time and the before-change road sign, and value represents the after-change road sign.

Figures 5, 6:
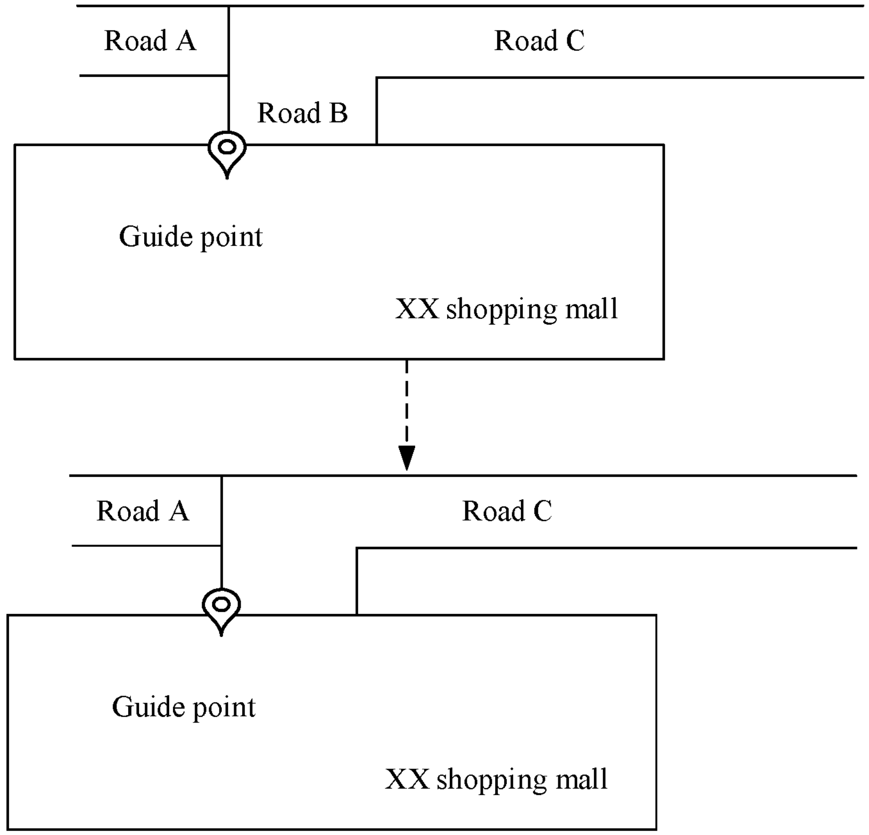
FIG. 5 is a schematic diagram of another exemplary method for updating associated information of a guide point according to an embodiment of this application.
FIG. 6 is a schematic diagram of another exemplary method for updating associated information of a guide point according to an embodiment of this application.

For example, FIG. 5 is a schematic diagram of another exemplary method for updating associated information of a guide point according to an embodiment of this application, as shown FIG. 5, key in the road change relationship library represents the combination of the update time and the before-change road sign, and value represents the after-change road sign; the first row of data indicates that the road A is changed on January 1, and the road A is changed into a road C; the second row of data indicates that the road B is changed on January 1, and the road B is changed into a road D; and the third row of data indicates that the road C is changed on January 2, and the road C is changed into a road E.

The update period of the data in the road change relationship library can be preset, and it can be configured to update every day, every week, every month, every quarter and the like, and can also be configured to be in a responsive updating mode; and as long as the road is updated, the corresponding record will be directly filled into the road change relationship library.

In some embodiments, in one embodiment, that the computer device determines a set of after-change road signs associated with the first update time and the first road sign in the preset road change relationship library can include but is not limited to searching a corresponding set of after-change road signs from the key-value database by taking the first road sign and the first update time as key; the after-change road signs found are value corresponding to key (the first road sign and the first update time).

Specifically, it includes but is not limited to that the computer device takes the first update time and the first road sign as initial values to execute a plurality of rounds of iterative search operations in the road change relationship library so as to obtain a set of after-change road signs, the after-change road signs found in the previous round of iterative search operation being used as the before-change road signs in the next round of iterative search operation during the plurality of rounds of iterative search operations.

In some embodiments, in one embodiment, the updating the first road sign corresponding to the target guide point according to the set of after-change road signs can include but is not limited to determining a set of after-change roads according to the set of after-change road signs; acquiring coordinates of the set of after-change roads; determining the road having a preset relationship with the target guide point in the set of after-change roads as the road with the updated target guide point, so as to update the first road sign corresponding to the target guide point; and replacing the first road sign with the corresponding road sign. The preset relationship can be freely set according to requirements, for example, the road closest to the target guide point can be determined as the road with the updated target guide point; or any road in the set of after-change roads can be used as the road with the updated target guide point.

For example, FIG. 6 is a schematic diagram of another exemplary method for updating associated information of a guide point according to an embodiment of this application, as shown in FIG. 6, that POI represents XX shopping mall is taken as an example, the guide point is at the road B, and the guide point is closer to the road A than the road C; if the first road with the target guide point is the road B and the road B is changed into the road C, navigation is performed from the road closest to the coordinates of the guide point according to the existing related technology; since the road A is farther to the guide point than the road C, the guide point will be adaptively updated into the guide point at the road A; as shown in FIG. 6, the road A is not communicated with the guide point, at the moment, if the navigation is performed by taking the guide point as the navigation path, the navigation will point to the road A, and a wrong road will be navigated; according to this application, the update time t of the road B is searched from the road change time library, then the change from the road B into the road C at the update time t is searched from the road change relationship library according to the road B and the update time t, and at the moment, the road B with the first road sign corresponding to the guide point will be adaptively replaced with the road C, so that the navigation path is to pass through the road C rather than the road A, and as a result, the problem that the navigation path associated with the guide point is inaccurate after the road is updated is avoided; and the accuracy of updating the guide point is improved when the coordinates of the guide point are updated.

According to the embodiment above, the adopted mode includes: acquiring the first road sign corresponding to the target guide point, the first road sign being the road sign of the first road with the target guide point; acquiring the first update time having a corresponding relationship with the first road sign from the road change time library under the condition that the first road sign is found in the preset road change time library, the plurality of sets of update times and road signs which have a corresponding relationship being recorded in the road change time library, the road signs in the road change time library being configured to represent the roads with changes, the update time in the road change time library being the time at which the roads represented by the road signs having a corresponding relationship are changed, and the first update time being the earliest update time in the update times having a corresponding relationship with the first road sign in the road change time library; determining the set of after-change road signs associated with the first update time and the first road sign in the preset road change relationship library, the plurality of sets of update times, before-change road signs and after-change road signs which have a corresponding relationship being recorded in the road change relationship library, the update time in the road change relationship library being the time at which the before-change road is changed to obtain the after-change road, the before-change road sign being configured to represent the before-change road, and the after-change road sign being configured to represent the after-change road; and updating the first road sign corresponding to the target guide point according to the set of after-change road signs; and the first road sign of the guide point is acquired, the corresponding update time is found in the update time library, then new roads obtained after updating of the roads corresponding to the first road sign are determined based on the first road sign and the update time, and the guide point is associated with the after-change roads, so that the purpose of updating the first road sign corresponding to the target guide point is achieved. The road sign of the target guide point after updating is determined by combining the road change time library and the road change relationship library, and detailed processes of road changes are recorded in the road change time library and the road change relationship library, so the road sign of the target guide point after updating determined by combining the road change time library and the road change relationship library is accurate, then the technical effects of improving the updating efficiency and the updating accuracy of the guide point and enabling the updated guide point to meet actual needs are achieved, and as a result, the technical problem of low accuracy of the guide point updating process in related technologies is solved.

In some embodiments, the determining the set of after-change road signs associated with the first update time and the first road sign in a preset road change relationship library includes:

taking the first update time and the first road sign as the initial values to execute the plurality of rounds of iterative search operations in the road change relationship library so as to obtain a set of after-change road signs, the after-change road signs found in the previous round of iterative search operation being used as the before-change road signs in the next round of iterative search operation during the plurality of rounds of iterative search operations.

In some embodiments, in this embodiment, taking the first update time and the first road sign as the initial values can be understood that the plurality of rounds of iterative search operations are started at the earliest update time of the first road sign in the road change time library. The computer device can determine a set of after-change road signs associated with the first update time and the first road sign by combining the road change time library and the road change relationship library. If a set of after-change road signs are found, each road sign in the set of after-change road signs is used as the before-change road sign in the next round of iterative search operation, and then the next round of iteration is carried out; new update time which corresponds to the after-change road sign of the previous round of iterative search operation and is later than the first update time is searched from the road change time library; and then the after-change road signs are continuously searched from the road change relationship library based on the new update time and the after-change road sign of the previous round of iterative search operation, for example, the update time and the after-change road sign of the previous round of iterative search operation are used as key, one or more corresponding values are found from the road change relationship library, and then a set of values are obtained. After the plurality of rounds of iterative search operations are carried out, the update time corresponding to the after-change road sign of the previous round of iterative search operation cannot be found from the road change time library.

Figures 7, 8:
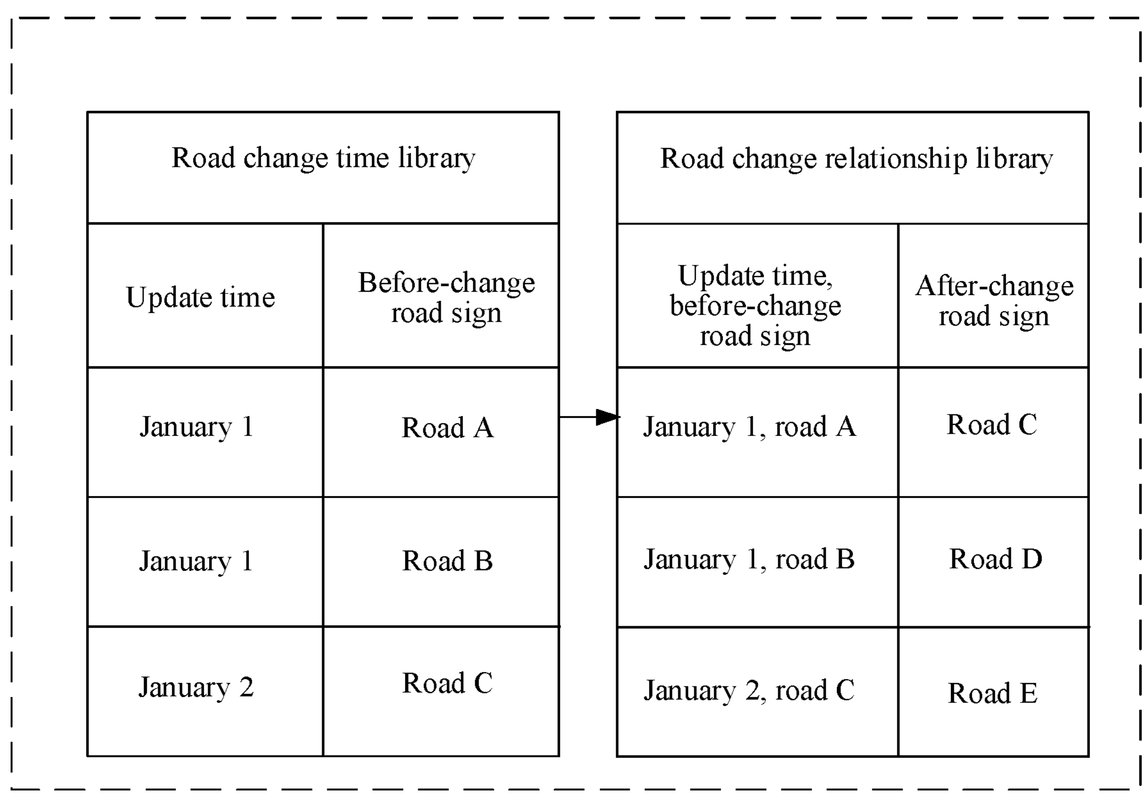
FIG. 7 is a schematic diagram of another exemplary method for updating associated information of a guide point according to an embodiment of this application.
FIG. 8 is a schematic diagram of another exemplary method for updating associated information of a guide point according to an embodiment of this application.

For example, FIG. 7 is a schematic diagram of another exemplary method for updating associated information of a guide point according to an embodiment of this application, as shown in FIG. 7, key in the road change time library represents the road sign, and value represents the update time; key in the road change relationship library represents the combination of the update time and the before-change road sign, and value represents the after-change road sign; if the first road with the target guide point is the road A, the computer device will search the first update time as January 1 from the road change time library according to the first road sign of the road A, and search a set of after-change road signs as "road C" from the road change relationship library according to the first road sign "road A" and the first update time "January 1"; the road signs recorded in the road change time library represent the roads with changes, so the road signs recorded in the road change time library are the before-change road signs actually; the computer device takes the "road C" as the before-change road sign to search the update time corresponding to the "road C" from the road change time library, and takes the update time found as the update time of the next round; under a condition that the update time "January 2" of the next round is found, the computer device takes the update time as "January 2" and the before-change road sign as "road C" to search a set of corresponding after-change road signs "road E" of the next round from the road change relationship library; and the "road E" serving as the before-change road sign cannot be used for information search in the road change time library any more, so the iterative search operation is ended, and the "road E" is the set of after-change road signs.

In some embodiments, in one embodiment, a set of after-change road signs can be found only through the road change relationship library. For example, as shown in FIG. 7, if the first road with the target guide point is the road A, and the computer device will search the first update time as January 1 from the road change time library according to the first road sign of the road A, and search a set of after-change road signs as "road C" from the road change relationship library according to the first road sign "road A" and the first update time "January 1". The computer device takes the "road C" as the before-change road, and searches to obtain that the "road C" is changed on January 2 from the road change relationship library. Further, the computer device takes the "road C" and the "January 2" as key values to continue to search in the road change relationship library so as to obtain the "road E". The "road E" serving as the before-change road sign cannot be used for information search in the road change relationship library any more, so the iterative search operation is ended, and the "road E" is the set of after-change road signs.

The above is only an example, and the embodiment does not make any specific limitation.

In the embodiment, the plurality of rounds of iterative search operations are carried out in the road change relationship library so as to obtain a complete road change process taking the first update time and the first road sign as the initial values, that is, a complete change process of the first road with the target guide point can be obtained, so the road sign to which the target guide point needs to be updated is accurately determined based on the complete road change process subsequently. In some embodiments, the taking the first update time and the first road sign as the initial values to execute the plurality of rounds of iterative search operations in the road change relationship library so as to obtain a set of after-change road signs includes:

repeatedly executing the following round of iterative search operation until a preset search ending condition is met, the initial value of a current before-change road sign list being the first road sign and the first update time, the current before-change road sign list including at least one set of list data, and each set of list data including the before-change road sign and the update time which have a corresponding relationship;

searching the after-change road sign corresponding to each set of list data in the current before-change road sign list from the road change relationship library so as to obtain a current after-change road sign list;

taking the after-change road sign in the current after-change road sign list as the before-change road sign in the next round of iterative search operation in a case that the current after-change road sign list is not empty, searching the update time corresponding to the before-change road sign in the next round of iterative search operation from the road change time library, and updating the current before-change road sign list under a condition that the update time corresponding to the before-change road sign in the next round of iterative search operation is found, the updated current before-change road sign list including the before-change road sign and the update time which have a corresponding relationship in the next round of iterative search operation; and determining the before-change road sign in the next round of iterative search operation as the after-change road sign in the set of after-change road signs under a condition that the update time corresponding to the before-change road sign in the next round of iterative search operation cannot be found.

In some embodiments, in one embodiment, each set in the current before-change road sign list includes the before-change road sign and update time which have a corresponding relationship in the current round of iterative search operation, that is, for each set of list data in the current before-change road sign list, the computer device can search corresponding after-change road sign from the road change relationship library, then the computer device will store the after-change road signs found to obtain a current after-change road sign list. The computer device can search the update time corresponding to each after-change road sign in the current after-change road sign list from the road change time library, and combine each after-change road sign in the current after-change road sign list and the update time corresponding to each after-change road sign to obtain a current after-change road sign list in the next round of iterative search operation.

In some embodiments, in one embodiment, the search ending condition can be configured as that associated information of the after-change road sign in the previous round cannot be found in the next round from the road change time library, that is, if the update time cannot be found from the road change time library by taking the after-change road sign in the current round as the before-change road sign, the road represented by the after-change road sign in the current round is not changed, the road is the road into which the road represented by the first road sign is finally changed, and at the moment, the computer device stops iterative search and determines the before-change road sign in the next round of iterative search operation as the after-change road sign in the set of after-change road signs, namely, the after-change road sign in the current round is determined as the after-change road sign in the set of after-change road signs.

In some embodiments, in one embodiment, it can also be configured to stop iterative search when the number of times of the plurality of rounds of iterative search reaches a preset threshold value, so the computer device can determine the before-change road sign in the next round of iterative search operation as the after-change road sign in the set of after-change road signs.

In some embodiments, in one embodiment, that the current after-change road sign list is not empty can be understood as that there is a corresponding set of current after-change road signs corresponding to the current before-change road sign in the road change relationship library, namely, the before-change road sign used by the current iterative search operation can be configured to search a set of after-change road signs from the road change relationship library.

It is to be easily understood that in the first round of iterative search operation, the first road sign and the first update time are used as the initial values, so in the first round of iterative search operation, the first road sign can be regarded as the before-change road sign, the first update time is regarded as the update time, and then the after-change road sign corresponding to the before-change road sign and the update time can also be searched from the road change relationship library in the first round of iterative search operation.

In this embodiment, the before-change road sign list and the after-change road sign list are generated, and continuous iterative search can be implemented based on the generated before-change road sign list and the after-change road sign list, so that the road into which the first road is finally changed can be found based on the continuous iterative search operation, and then the target guide point can be accurately changed based on the found road into which the first road is finally changed.

As an exemplary scheme, the searching the update time corresponding to the before-change road sign in the next round of iterative search operation in the road change time library includes:

- searching the update time having a corresponding relationship with the before-change road sign in the next round of iterative search operation from the road change time library;
- determining the update time found as the update time having a corresponding relationship with the before-change road sign in the next round of iterative search operation under a condition that one update time having a corresponding relationship with the before-change road sign in the next round of iterative search operation is found and the update time found is later than the current update time, the current update time being the update time having a corresponding relationship with the before-change road sign in the next round of iterative search operation in the current before-change road sign list; and
- determining a target update time closest to the current update time in the plurality of update times under a condition that the plurality of update times having a corresponding relationship with the before-change road sign in the next round of iterative search operation and later than the current update time are found, and determining the target update time as the update time having a corresponding relationship with the before-change road sign in the next round of iterative search operation.

In some embodiments, in one embodiment, that one update time having a corresponding relationship with the before-change road sign in the next round of iterative search operation is found and the update time found is later than the current update time can be understood as that the update time having a corresponding relationship with the before-change road sign in the next round of iterative search operation is unique in the road change time library, namely, the update time is later than the current update time, and the update time having a corresponding relationship with the before-change road sign in the next round of iterative search operation is unique.

For example, FIG. 8 is a schematic diagram of another exemplary method for updating associated information of a guide point according to an embodiment of this application, as shown in FIG. 8, that the current update time is January 1 is taken as an example, the current before-change sign is the road A, and if the current after-change sign is found from the road change relationship library to be the road C, the computer device will take the road C as the before-change road sign in the next round of iterative search operation, and determine the update time having a corresponding relationship as January 2, and the update time is later than January 1, therefore, the computer device will determine the update time January 2 found as the update time having a corresponding relationship with the before-change road sign in the next round of iterative search operation.

In the embodiment, the update time found is determined as the update time having a corresponding relationship with the before-change road sign in the next round of iterative search operation under a condition that the update time found is determined to be later than the current update time, thus each search is time progressive search, a set of change times taking the first update time as the start point can be found, and the updated road sign of the target guide point can be accurately determined based on the set of change times found.

In some embodiments, in one embodiment, that the plurality of update times having a corresponding relationship with the before-change road sign in the next round of iterative search operation and later than the current update time can be understood as that there are a plurality of update times which have a corresponding relationship with the before-change road sign in the next round of iterative search operation and are later than the current update time, at the moment, the update time closest to the current update time is determined as the target update time to be matched with the before-change road sign in the next round of iterative search operation, and a set of after-change road signs in the next round of iterative search operation can be determined from the road change relationship library.

Figure 9:
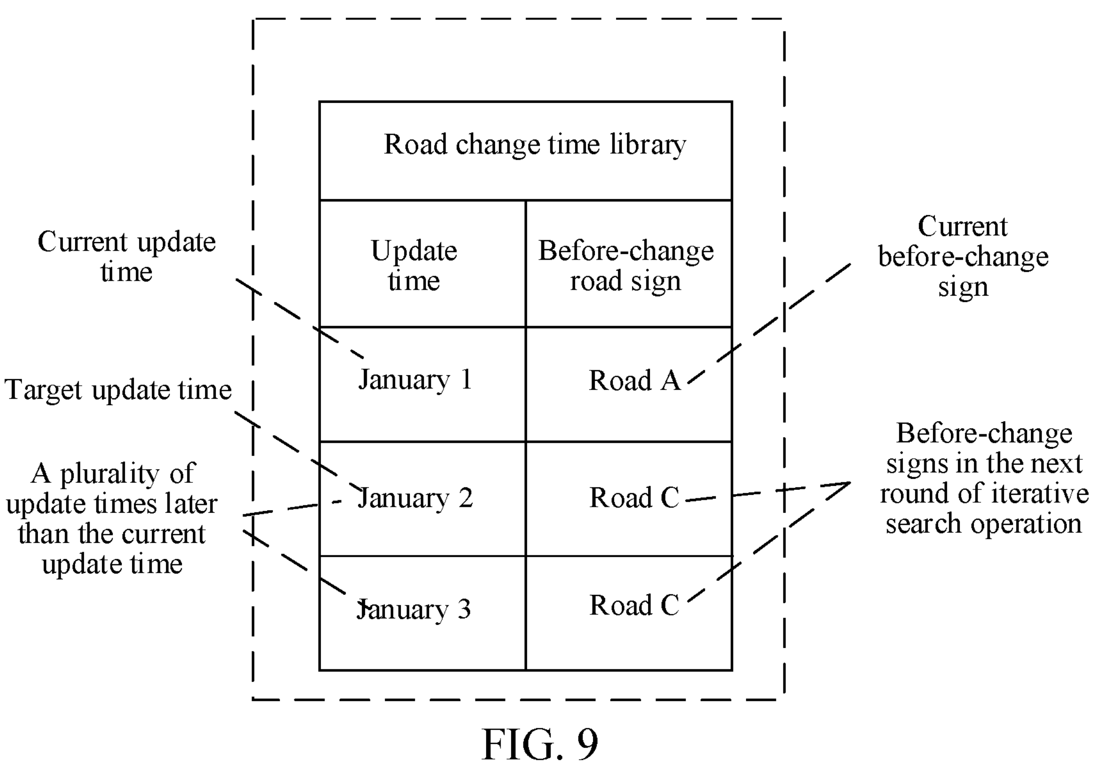
FIG. 9 is a schematic diagram of another exemplary method for updating associated information of a guide point according to an embodiment of this application.

For example, FIG. 9 is a schematic diagram of another exemplary method for updating associated information of a guide point according to an embodiment of this application, as shown in FIG. 9, that the current update time is January 1 is taken as an example, the current before-change sign is the road A, and if the current after-change sign is found to be the road C from the road change relationship library, the computer device will take the road C as the before-change road sign in the next round of iterative search operation, and determine the plurality of update times having a corresponding relationship as January 2 and January 3, and the plurality of update times are all later than January 1, therefore, the target update time January 2 closest to the current update time is determined as the update time having a corresponding relationship with the before-change road sign in the next round of iterative search operation so as to be matched with the before-change road sign in the next round of iterative search operation, and the computer device will determine a set of after-change road signs in the next round of iterative search operation from the road change relationship library.

In the embodiment, the target update time closest to the current update time is determined as the update time having a corresponding relationship with the before-change road sign in the next round of iterative search operation, so that the path of iterative search is shortened, and the iterative search efficiency is improved.

In some embodiments, the repeatedly executing a round of iterative search operation until a preset search ending condition is met includes:

determining that the search ending condition is met in a case that the current after-change road sign list is empty, and ending the plurality of rounds of iterative search operation; or determining that the search ending condition is met under a condition that an $N^{th}$ round of iterative search operation is ended, and ending the plurality of rounds of iterative search operation, N being a positive integer greater than or equal to 2.

In some embodiments, in one embodiment, that the current after-change road sign light is empty can be understood as that the after-change road sign corresponding to the before-change road sign in the previous round cannot be found from the road change relationship library, that is, the update time corresponding to the before-change road sign in the current round cannot be found from the road change time library.

In some embodiments, in one embodiment, N can be preset by the system, and can be associated with update periods of the road change relationship library and the road change time library.

In the embodiment, by stopping iteration in time when an iteration stopping condition is met, unnecessary iteration processes can be reduced, and resources such as computer power consumed by iteration can be saved.

In some embodiments, the method for updating associated information of the guide point also includes a step of updating the road change time library and the road change relationship library. The step of updating the road change time library and the road change relationship library includes: acquiring a before-change road, and determining an after-change road obtained after the before-change road is changed under a condition that the before-change road is changed; and updating the road change time library and the road change relationship library according to at least one of the road sign of the before-change road, the time at which the before-change road is changed or the road sign of the after-change road.

Specifically, if the road is changed, the computer device will update the road change time library and the road change relationship library based on the road sign of the before-change road, the change time of the road or the road sign of the after-change road.

In the embodiment, by updating the road change time library and the road change relationship library in real time, a more accurate after-change road sign can be found based on the road change time library and the road change relationship library which are updated in real time.

In some embodiments, the method for updating associated information of the guide point also includes a step of updating the road change time library and the road change relationship library. The step of updating the road change time library and the road change relationship library includes:

adding the first update time and the first road sign which have a corresponding relationship in the road change time library and adding the first update time, the first road sign serving as the before-change road sign and a second road sign serving as the after-change road sign which have a corresponding relationship in the road change relationship library under a condition that the first road is changed into a second road at the first update time, and the second road sign being the road sign of the second road; or adding the first update time and the first road sign which have a corresponding relationship in the road change time library, adding the first update time, the first road sign serving as the before-change road sign and the second road sign serving as the after-change road sign which have a corresponding relationship in the road change relationship library, and adding the first update time, the first road sign serving as the before-change road sign and a third road sign serving as the after-change road sign which have a corresponding relationship in the road change relationship library under a condition that the first road is changed into the second road and a third road at the first update time, the third road sign being the road sign of the third rod; or adding the first update time and the first road sign which have a corresponding relationship and the first update time and the second road sign which have a corresponding relationship in the road change time library, the first road sign serving as the before-change road sign and the second road sign serving as the after-change road sign which have a corresponding relationship in the road change relationship library, and adding the first update time, the second road sign serving as the before-change road sign and the third road sign serving as the after-change road sign which have a corresponding relationship in the road change relationship library under a condition that the first road and the second road are changed into the third road at the first update time, adding the first update time.

In some embodiments, in one embodiment, the before-change road includes the first road; the time at which the before-change road is changed includes the first update time; the after-change road includes the second road; and the change from the first road into the second road at the first update time can include but is not limited to the change from the road A into the road B at time T1, the first update time T1 and the first road sign "road A" which have a corresponding relationship are added in the road change time library, the first update time T1, the first road sign "road A" serving as the before-change road sign and the second road sign "road B" serving as the after-change road sign which have a corresponding relationship are added in the road change relationship library.

Figure 10:
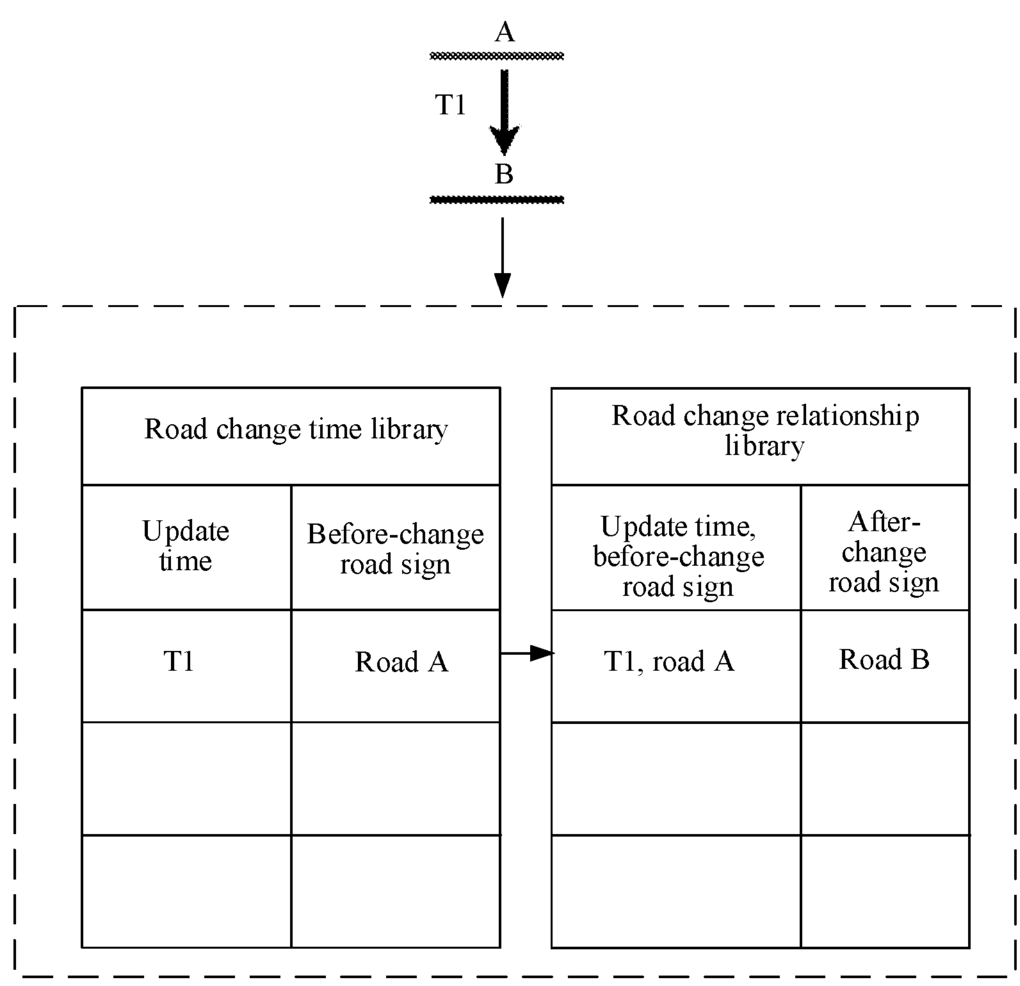
FIG. 10 is a schematic diagram of another exemplary method for updating associated information of a guide point according to an embodiment of this application.

For example, FIG. 10 is a schematic diagram of another exemplary method for updating associated information of a guide point according to an embodiment of this application, as shown in FIG. 10, if the road A is changed into the road B at the time T1, the computer device will add a set of road change time library data corresponding to the T1 and the road A into the road change time library, and add a set of road change relationship library data corresponding to the T1, the road A and the road B into the road change relationship library.

In some embodiments, in one embodiment, the before-change road includes the first road; the time at which the before-change road is changed includes the first update time; the after-change road includes the second road and the third road; the change from the first road into the second road and the third road at the first update time can include but is not limited to the change from the road A into the road B and the road C at the time T1; the first update time T1 and the first road sign "road A" which have a corresponding relationship are added in the road change time library; the first update time T1, the first road sign "road A" serving as the before-change road sign and the second road sign "road B" serving as the after-change road sign which have a corresponding relationship are added in the road change relationship library; and the first update time T1, the first road sign "road A" serving as the before-change road sign and the third road sign "road C" serving as the after-change road sign which have a corresponding relationship are added in the road change relationship library.

Figure 11:
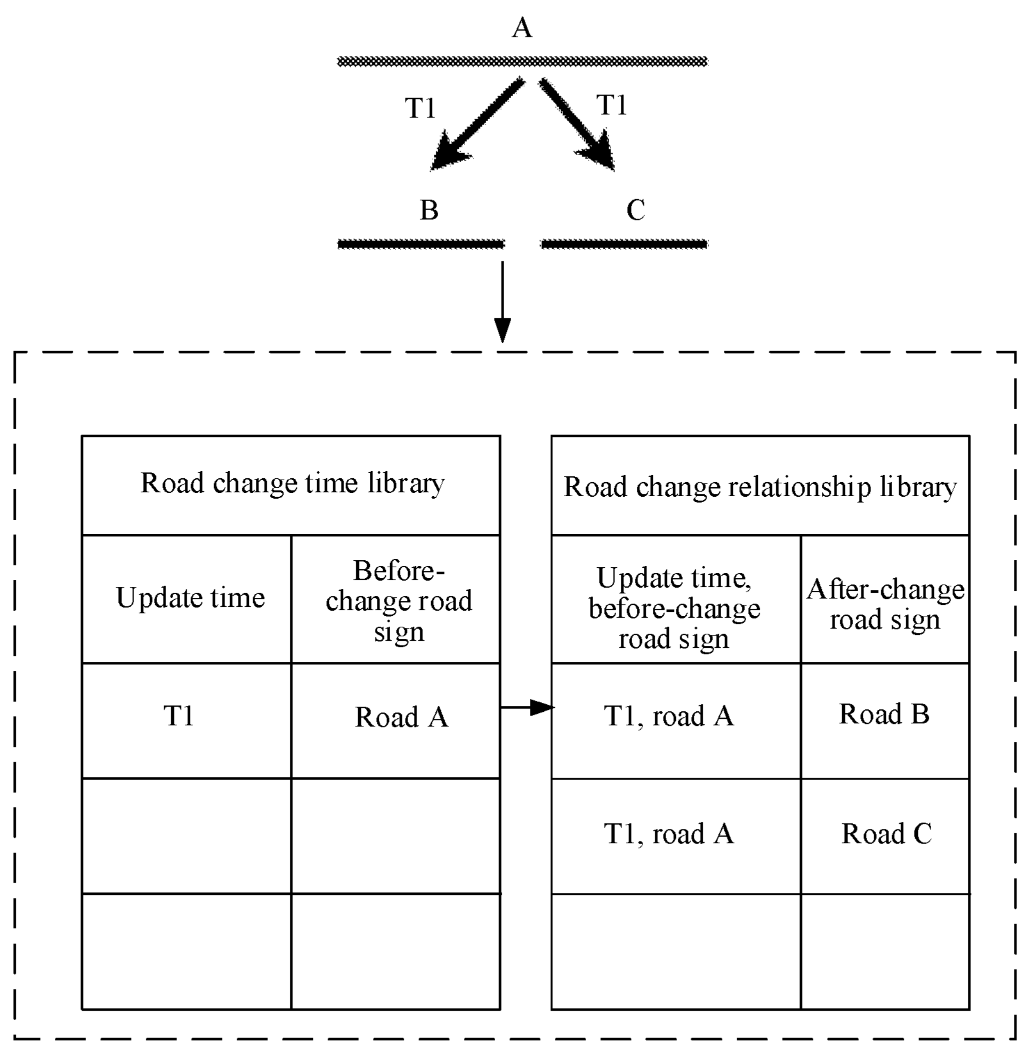
FIG. 11 is a schematic diagram of another exemplary method for updating associated information of a guide point according to an embodiment of this application.

For example, FIG. 11 is a schematic diagram of another exemplary method for updating associated information of a guide point according to an embodiment of this application. As shown in FIG. 11, if the road A is changed into the road B and the road C at the time T1, the computer device will add a set of road change time library data corresponding to the T1 and the road A into the road change time library, add a set of road change relationship library data corresponding to the T1, the road A and the road B into the road change relationship library, and add a set of road change relationship library data corresponding to the T1, the road A and the road C into the road change relationship library.

In some embodiments, in one embodiment, the before-change road includes the first road and the second road; the time at which the before-change road is changed includes the first update time; the after-change road includes the third road; the change from the first road and the second road into the third road at the first update time can include but is not limited to the change from the road A and the road B into the road C at time T1; the computer device adds the first update time T1 and the first road sign "road A" which have a corresponding relationship and the first update time T1 and the second road sign "road B" which have a corresponding relationship in the road change time library, adds the first update time T1, the first road sign "road A" serving as the before-change road sign and the third road sign "road C" serving as the after-change road sign which have a corresponding relationship in the road change relationship library, and adds the first update time T1, the second road sign "road B" serving as the before-change road sign and the third road sign "road C" serving as the after-change road sign which have a corresponding relationship in the road change relationship library.

Figure 12:
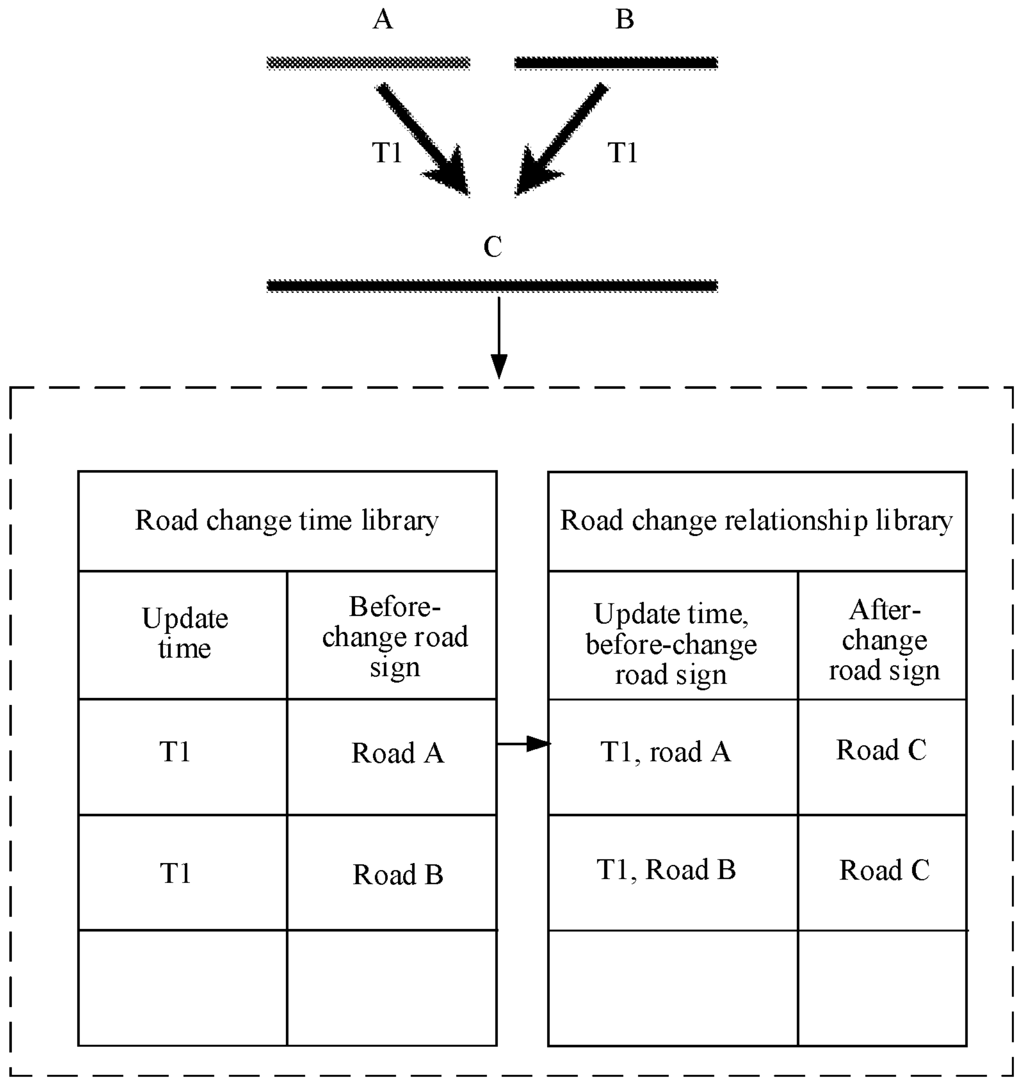
FIG. 12 is a schematic diagram of another exemplary method for updating associated information of a guide point according to an embodiment of this application.

For example, FIG. 12 is a schematic diagram of another exemplary method for updating associated information of a guide point according to an embodiment of this application, as shown in FIG. 12, if the road A and the road B are changed into the road C at time T1, the computer device will add a set of road change time library data corresponding to T1 and the road A into the road change time library, add a set of road change time library data corresponding to T1 and road B into the road change time library, add a set of road change relationship library data corresponding to T1, road A and road C into the road change relationship library, and add a set of road change relationship library data corresponding to T1, road B and road C into the road change relationship library.

The above is only an example, and the embodiment does not make any specific limitation.

In the above embodiment, by checking the change condition of the road in time, the road change time library and the road change relationship library can be updated in real time based on the change condition of the road change when the road change is determined, so that the update timeliness of the road change time library and the road change relationship library is improved.

In some embodiments, the method further includes:

adding the first update time and the first road sign which have a corresponding relationship in the road change time library, adding the first update time, the first road sign serving as the before-change road sign and the first road sign serving as the after-change road sign which have a corresponding relationship in the road change relationship library, and adding the first update time, the first road sign serving as the before-change road sign and the second road sign serving as the after-change road sign which have a corresponding relationship in the road change relationship library under a condition that the first road is changed into the first road and the second road at first update time, the second road sign being the road sign of the second road; or adding the first update time and the first road sign which have a corresponding relationship and the first update time and the second road sign which have a corresponding relationship in the road change time library, adding the first update time, the first road sign serving as the before-change road sign and the first road sign serving as the after-change road sign which have a corresponding relationship in the road change relationship library, and adding the first update time, the second road sign serving as the before-change road sign and the first road sign serving as the after-change road sign which have a corresponding relationship in the road change relationship library under a condition that the first road and the second road are changed into the first road at the first update time.

In some embodiments, in one embodiment, the before-change road includes the first road; the time at which the before-change road is changed includes the first update time; and the after-change road includes the first road and the second road. The change from the first road into the first road and the second rod at the first update time can include but is not limited to the change from the road A changed into the road A and the road B at time T1; the computer device adds the first update time T1 and the first road sign "road A" which have a corresponding relationship in the road change time library, adds the first update time T1, the first road sign "road A" serving as the before-change road sign and the second road sign "road A" serving as the after-change road sign which have a corresponding relationship in the road change relationship library, and adds the first update time T1, the first road sign "road A" serving as the before-change road sign and the third road sign "road B" serving as the after-change road sign which have a corresponding relationship in the road change relationship library.

In some embodiments, in one embodiment, the before-change road includes the first road and the second road; the time at which the before-change road is changed includes the first update time; and the after-change road includes the first road. The change from the first road and the second road into the first road at the first update time can include but is not limited to the change from the road A and the road B into the road A at the time T1; and the computer device adds the first update time T1 and the first road sign "road A" which have a corresponding relationship and the first update time T1 and the second road sign "road B" which have a corresponding relationship in the road change time library, adds the first update time T1, the first road sign "road A" serving as the before-change road sign and the third road sign "road A" serving as the after-change road sign which have a corresponding relationship in the road change relationship library, and adds the first update time T1, the second road sign "road B" serving as the before-change road sign and the third road sign "road A" serving as the after-change road sign which have a corresponding relationship in the road change relationship library.

In the embodiment, the road change time library and the road change relationship library can be accurately updated based on the change conditions of the roads by analyzing the change conditions of the roads.

Figure 13:
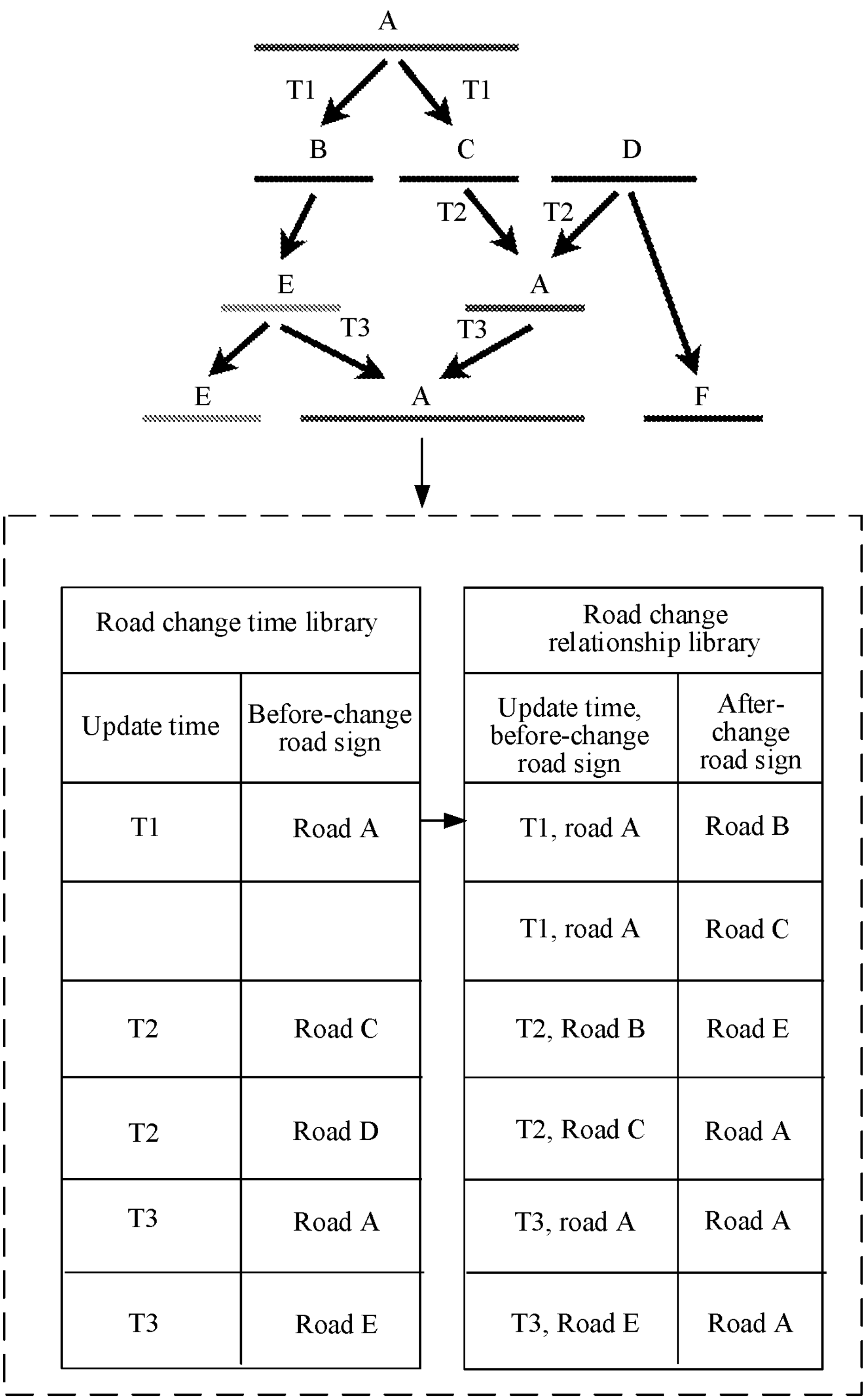
FIG. 13 is a schematic diagram of another exemplary method for updating associated information of a guide point according to an embodiment of this application.

When the road is subjected to a plurality of rounds of changes, the plurality of rounds of iterative search operations are implemented, for example, FIG. 13 is a schematic diagram of another exemplary method for updating associated information of a guide point according to an embodiment of this application, as shown in FIG. 13, if the road A is changed into the road B and the road C at time T1, the computer device will add a set of road change time library data corresponding to T1 and the road A into the road change time library, add a set of road change relationship library data corresponding to T1, the road A and the road B into the road change relationship library, and add a set of road change relationship library data corresponding to T1, the road A and the road C into the road change relationship library; if the road B is changed into the road E at time T2, the computer device will add a set of road change time library data corresponding to T2 and the road B into the road change time library, add a set of road change relationship library data corresponding to T2, the road B and the road E into the road change relationship library, add a set of road change time library data corresponding to T2 and the road C into the road change time library, and add a set of road change relationship library data corresponding to T2, the road C and the road A into the road change relationship library; and if the road E and the road A are changed into the road A at time T3, the computer device will add a set of road change time library data corresponding to T3 and the road E into the road change time library, add a set of road change relationship library data corresponding to T3, the road E and the road A into the road change relationship library, add a group of road change time library data corresponding to T3 and the road A into the road change time library, and add a set of road change relationship library data corresponding to T3, the road A and the road A into the road change relationship library.

The above is only an example, and the embodiment does not make any specific limitation.

In some embodiments, the updating the first road sign corresponding to the target guide point according to the set of after-change road signs includes:

- determining a road closest to the target guide point in a set of roads represented by the set of after-change road signs as a target road; and
- updating a road sign corresponding to the target guide point from the first road sign to a target road sign, the target road sign being a road sign of the target road with the target guide point.

In some embodiments, in one embodiment, the computer device will determine the road closest to the target guide point in the set of roads corresponding to the set of after-change road signs as the target road under a condition that the set of after-change road signs include at least two road signs. The computation mode can specifically include but is not limited to the minimum distance between the guide point and any point of each road in the set of roads, and can also include but is not limited to the minimum average value of the distance between the guide point and each point of each road in the set of roads.

In some embodiments, in one embodiment, the updating a road sign corresponding to the target guide point from the first road sign to a target road sign by the computer device can include but is not limited to replacing the first road sign recorded in the guide information of the target guide point with the target road sign, the road sign with the target guide point being recorded in the guide information of the target guide point.

In the embodiment, by determining the road closest to the target guide point as the target road, the change distance of the target guide point can be reduced; by reducing the change distance of the target guide point, the difference between the navigation path planned based on the before-change target guide point and a navigation path planned based on the after-change target guide point can be reduced. In addition, the user is generally close to the before-change target guide point during navigation; and the navigation path planned based on the after-change target guide point can also be close to the user by reducing the change distance of the target guide point, and thus the user can conveniently navigate according to the planned navigation path. In some embodiments, the method further includes:

- acquiring a target point closest to the target guide point on the target road, the target point being a position point closest to the target guide point on the target road; and
- updating coordinates of the target guide point to coordinates of the target point.

In some embodiments, in one embodiment, after the target road is determined, the point, closest to the target guide point, on the target road is determined as the coordinates of the target guide point, that is, the coordinates of the target guide point are updated to the coordinates of the target point closest to the target guide point.

In this embodiment, the coordinates of the target guide point are changed to the target point, thus the change distance of the target guide point can be reduced, and the user can quickly go to the after-change target guide point.

In some embodiments, the determining a road closest to the target guide point in a set of roads represented by the set of after-change road signs as a target road includes:

- acquiring coordinates of a set of road points on each road in the set of roads;
- determining the position of each road according to the coordinates of the set of road points on each road, and determining the distance between each road and the target guide point according to the coordinates of the target guide point and the position of each road; and
- determining the road closest to the target guide point as the target road.

In some embodiments, in this embodiment, the set of road points include but are not limited to shape point data of the road, and the change of the road can include but is not limited to the change of the set of road points.

This application is further described in combination with specific embodiment as follows:

The road id corresponds to the abovementioned road sign, and the following inheritance corresponds to the abovementioned change.

The road has two important service backgrounds:

(1) The road is crucial to the guide point, it is a carrier of the guide point, and the guide point is to be made on a correct road; and (2) Road data is changed and updated every day, and the specific representation forms include: addition, deletion, segmentation, merging, id inheritance, road shape change, change of detail attributes and the like. Each change may affect the guide point. This application includes, but is not limited to, a description of how the guide point is updated accordingly after inheritance of road id (phenomena such as segmentation, merging and road shape change) occurs.

Inheritance of road id: the road data will be continuously changed in the geographic information system in order to adapt to the road change of the real world; one representation form includes but is not limited to the segmentation and merging of roads and the change of road shapes, and then the road id will be inherited.

Once the inheritance of the road id occurs, there are two representation forms: 1, the old id is invalid, and road details cannot be acquired based on the id; and 2, the id is not changed, but the shapes and the attributes of the roads are changed.

The specific condition of the inheritance of the road id is relatively complicated, and an abstract summary includes the following contents: FIG. 14 is a schematic diagram of another exemplary method for updating associated information of a guide point according to an embodiment of this application, as shown in FIG. 14, the capital letter represents the road id, and the transverse line represents the road:

in background data of the geographic information system, the inheritance of the road id is generally to record a piece of relational data on the date when the inheritance occurs, for example, for a scene 3 shown in FIG. 14, the following pieces of road id inheritance relational data will be recorded on 3 dates:

date 1: A→B, C date 2: B→E date 2: C, D→A date 3: E→E (a new E, id is not changed, the road shape is changed, for example, the road shape is shortened/lengthened, and the whole road shape is moved);

date 3: E, A→A (a new A, id is not changed, the road shape is changed, for example, the road shape is shortened/lengthened, and the whole road shape is moved); and date 3: D→F Update of inheritance of the road id of the guide point: if the id of the road with the guide point is inherited, it means that the road with the guide point is changed, and the guide road id and the guide coordinates need to be changed accordingly. For example, in the scene 3 shown in FIG. 14, if the guide road id of the guide point produced on date 1 is A, it can be seen based on an inheritance relationship chain that the road A becomes three roads E, A and F finally, at the moment, one road needs to be selected as a new guide road, and the original guide coordinates are updated to the road.

After the inheritance of the road id is updated, and if the guide point is not adaptively updated, the following negative effects might be caused:

For the scene 1, after the road id is inherited, the old id will be invalid, an online navigation strategy cannot be used for acquiring corresponding road information (mainly referring to a coordinate string) through the invalid road id, and only one road can be found nearby through the coordinates of the guide point to serve as the guide road, and as a result, the navigation effect is influenced (reduced).

For the scenes 2 and 3, the road id will not be invalid, but the position of the road coordinate string may be changed, and if the guide point is not adaptively updated, the coordinate string acquired by the online navigation strategy through the road id might be far away from the guide coordinates, and as a result, the navigation effect is influenced (reduced).

In this embodiment, the input of a model is historical full road id inheritance relationship data and guide point data (guide road id and guide coordinates), and the output of the model is anew guide point (including anew guide road id and new guide coordinates) adapted to the road id inheritance change.

Specifically, it includes but is not limited to the following contents:

(1) Storage and modeling of a road id inheritance relationship: the historical full road id inheritance relationship is modeled into two memory libraries, namely a road id inheritance time library (corresponding to the road change time library) and a road id inheritance relationship library (road change relationship library); and (2) Recursive traversal algorithm of road id inheritance relationship: the road id inheritance relationship is mathematically represented as a special directed graph, and the graph is characterized by having "double directions", the inheritance relationship is a dominant direction, and the time is a recessive direction. When a new id is found based on an old road id, the whole graph must be traversed in two directions at the same time, and all tail end nodes are found in the two directions at the same time.

Figure 15:
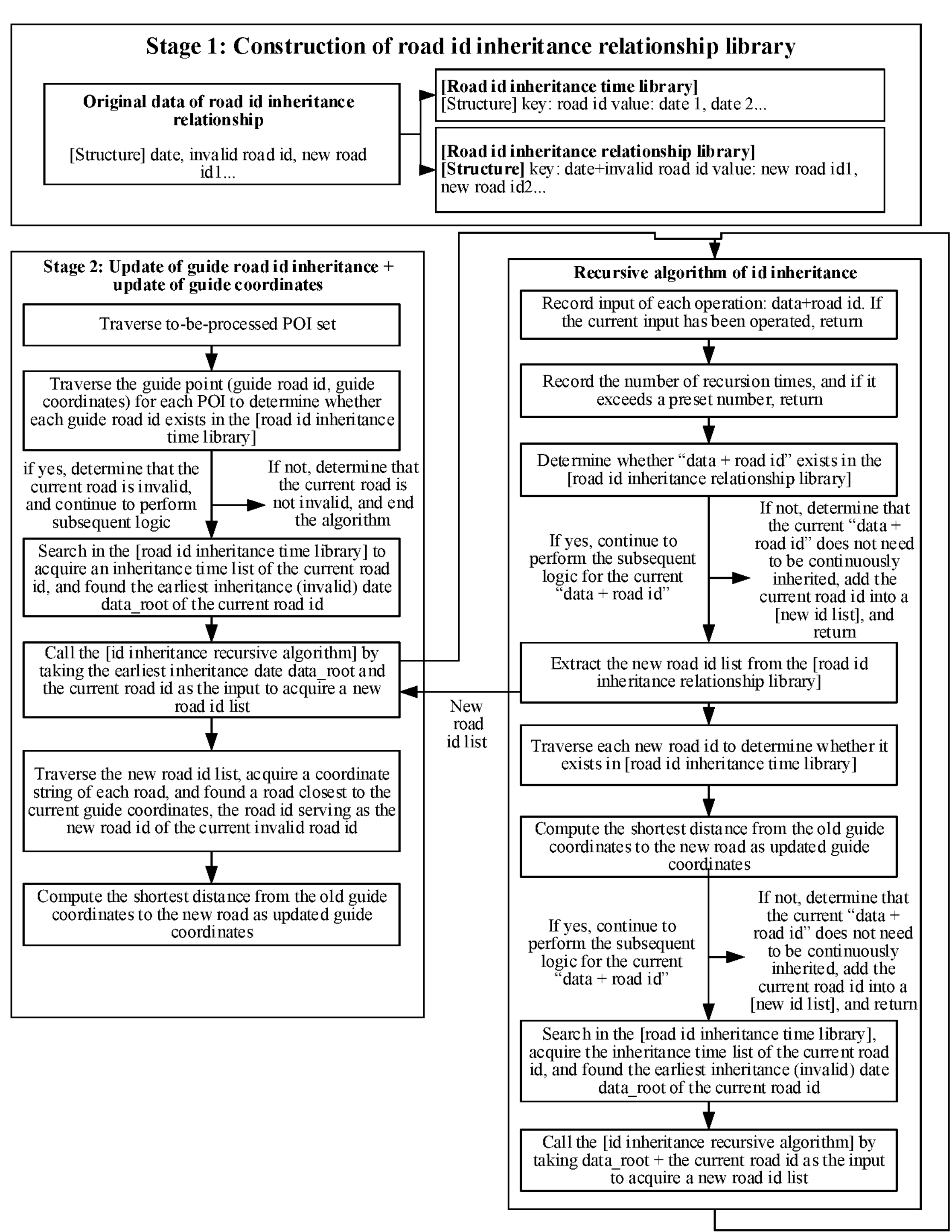
FIG. 15 is a schematic diagram of another exemplary method for updating associated information of a guide point according to an embodiment of this application.

FIG. 15 is a schematic diagram of another exemplary method for updating associated information of guide points according to an embodiment of this application, and as shown in FIG. 15, it specifically includes but is not limited to the following stages:

Stage I: Construction of a Road Id Inheritance Relationship Library:

The road id historical inheritance relationship is modeled into two libraries.

Road id inheritance time library (also called as the road change time library): it is in a key-value library form, key represents the road id, and value represents the inheritance time list;

Road id inheritance relationship library (also called as the road change relationship library): it is in a key-value library form, key represents the time of inheritance occurrence+old id, and value represents an inherited new id list.

Stage II: Update of Guide Road Id Inheritance+Update of Guide Coordinates:

STEP 1: Traverse a to-be-processed POI set, and traverse the road id of the road with each guide point of each POI (one POI may have a plurality of guide points, such as a plurality of guide points on a front entrance and a parking lot of a building).

STEP 2: Determine whether the road with the current guide point is in the road id inheritance time library.

If not, the current road with the guide point is not inherited in the history, and an algorithm exits; and if yes, the current road is invalid, and subsequent logic is continued.

STEP 3: Search the inheritance time list of the current road id (also called as the first road sign) from the road id inheritance time library, and search the earliest inheritance time date_root (also called as the first update time).

STEP 4: Call the id inheritance recursive algorithm (described in detail in the following) by taking date_root+road id as key, and acquire a new road id list (corresponding to a set of after-change road signs) obtained after completely traversing all historical inheritance events.

STEP 5: Traverse the new road id list, acquire the coordinate string of each road, and search a road (corresponding to the target road) closest to the old guide point coordinates, the road id serving as the new road id (also called as the after-change road sign) inherited from the old road id (also called as the before-change road sign).

STEP 6: Compute the closest position from the old guide coordinates to the new road as new guide coordinates.

Therefore, the guide road id and the guide coordinates are updated.

An independent algorithm is called in the following description process.

Recursive algorithm of id inheritance

Because of the characteristic of the "double-direction directed graph" of the road id inheritance relationship, the latest inheritance id list of the old ids needs to be acquired through the recursive algorithm, and the algorithm details are described as follows as shown in FIG. 15:

Input: date+road id; and

Output: a new id list corresponding to the input road ids.

Algorithm Logic:

STEP 0: Initial stage (traverse an exit rule to avoid infinite endless loop of traversing):

The input of "data+road id" in each operation is recorded, and if the current input is operated, exiting is performed; and the number of recursion times is recorded, and if the number of recursion times is greater than 200, exiting is performed.

STEP 1: Determine whether "date+road id" is in the road id inheritance relationship library:

If not, the current "date+road id" does not need to be continuously inherited, the current road id is the latest id, the current road id is added into the finally returned new id list, and upper-layer calling is performed.

If yes, the current "date+road id" is subjected to historical inheritance events, and subsequent logic needs to be continued.

STEP 2: Search the inherited new id list from the road id inheritance relationship library by taking the "date+road id" in the next round as key.

STEP 3: Traverse the id list, and determine whether each road id is in the road id inheritance time library:

If not, the current road id is not subjected to inheritance events, the current road id is added into the finally returned new id list, and upper-layer calling is performed; and if yes, the current road id is subjected to inheritance events, and subsequent logic needs to be continued.

STEP 4: Traverse the time list taken out from the road id inheritance time library, recursively call the current id inheritance recursive algorithm by taking "date+road id" as the input until the current road id is not subjected to the inheritance events, add the current road id into the finally returned new id list, and perform the upper-layer calling.

This embodiment can achieve at least the following technical effects: the data quality income is obviously improved; and if the id of the guide point road is invalid or the coordinate string of the road is changed, and if the guide point is updated by searching the road nearby through the existing solution, the guide quality of the updated data can only be about 95%. If the guide point is updated according to this application, the guide point quality of the updated data can be more than 99%, and the data quality can be obviously improved.

It is to be understood that in the specific embodiment of this application, related data such as user information and road information are involved; if the embodiment of this application is applied to a specific product or technology, user permission or agreement needs to be obtained; and further, collection, use and processing of the related data need to comply with related laws, regulations and standards of related countries and regions.

To simplify the description, the foregoing method embodiments are described as a series of action combination. But persons of ordinary skill in the art are to know that this application is not limited to any described sequence of the action, as some steps can adopt other sequences or can be executed simultaneously according to this application. In addition, a person skilled in the art is also to know that all the embodiments described in the specification are preferred embodiments, and the related actions and modules are not necessarily mandatory to this application.

Figure 16:
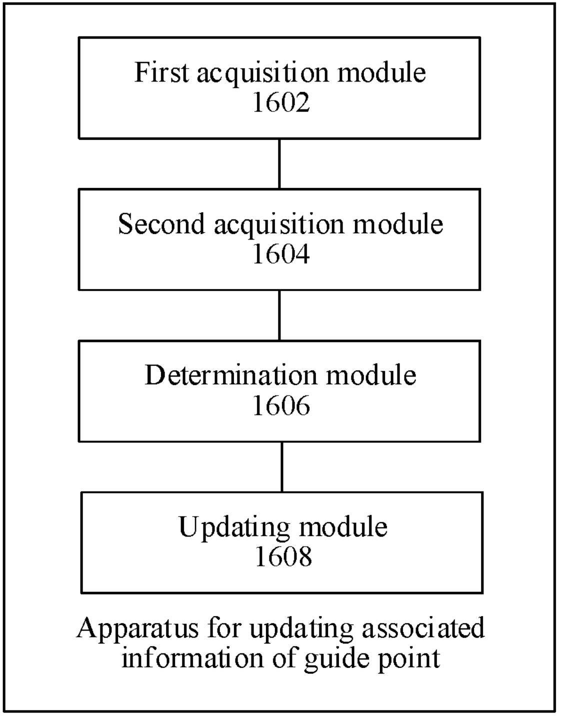
FIG. 16 is a structure schematic diagram of an exemplary apparatus for updating associated information of a guide point according to an embodiment of this application.

In another aspect, an embodiment of this application further provides an apparatus for updating associated information of a guide point, which is configured to implement the abovementioned method for updating associated information of the guide point. As shown in FIG. 16, the apparatus includes:

a first acquisition module 1602 which is configured to acquire a first road sign corresponding to a target guide point, the first road sign being a road sign of a first road with the target guide point;

a second acquisition module 1604 which is configured to acquire a first update time having a corresponding relationship with the first road sign from a road change time library under a condition that the first road sign is found in the preset road change time library, a plurality of sets of update times and road signs which have a corresponding relationship being recorded in the road change time library, the road signs in the road change time library being configured to represent roads with changes, the update time in the road change time library being the time at which the roads represented by the road signs having a corresponding relationship are changed, and the first update time being the earliest update time in the update times having a corresponding relationship with the first road sign in the road change time library;

a determination module 1606 which is configured to determine a set of after-change road signs associated with the first update time and the first road sign in a preset road change relationship library, a plurality of sets of update times, before-change road signs and after-change road signs which have a corresponding relationship being recorded in the road change relationship library, the update time in the road change relationship library being the time at which a road corresponding to the before-change road sign is changed to obtain a road corresponding to the after-change road sign, the before-change road sign being configured to represent a before-change road, and the after-change road sign being configured to represent an after-change road; and an updating module 1608 which is configured to update the first road sign corresponding to the target guide point according to the set of after-change road signs.

In some embodiments, the determination module includes:

a search unit which is configured to take the first update time and the first road sign as initial values to execute a plurality of rounds of iterative search operations in the road change relationship library so as to obtain a set of after-change road signs, the after-change road signs found in the previous round of iterative search operation being used as the before-change road signs in the next round of iterative search operation during the plurality of rounds of iterative search operations.

As an exemplary solution, the apparatus for updating associated information of the guide point utilizes the following mode to implement the process of taking the first update time and the first road sign as the initial values to execute the plurality of rounds of iterative search operations in the road change relationship library so as to obtain the set of after-change road signs:

repeatedly executing the following round of iterative search operation until a preset search ending condition is met, the initial value of a current before-change road sign list being the first road sign and the first update time, the current before-change road sign list including at least one set of list data, and each set of list data including the before-change road sign and the update time which have a corresponding relationship;

searching the after-change road sign corresponding to each set of list data in the current before-change road sign list from the road change relationship library so as to obtain a current after-change road sign list;

taking the after-change road sign in the current after-change road sign list as the before-change road sign in the next round of iterative search operation in a case that the current after-change road sign list is not empty, searching the update time corresponding to the before-change road sign in the next round of iterative search operation from the road change time library, and updating the current before-change road sign list under a condition that the update time corresponding to the before-change road sign in the next round of iterative search operation is found, the updated current before-change road sign list including the before-change road sign and the update time which have a corresponding relationship in the next round of iterative search operation; and determining the before-change road sign in the next round of iterative search operation as the after-change road sign in the set of after-change road signs under a condition that the update time corresponding to the before-change road sign in the next round of iterative search operation cannot be found.

In some embodiments, the apparatus for updating associated information of the guide point utilizes the following modes to implement the process of searching the update time corresponding to the before-change road sign in the next round of iterative search operation in the road change time library:

searching the update time having a corresponding relationship with the before-change road sign in the next round of iterative search operation from the road change time library; and determining the update time found as the update time having a corresponding relationship with the before-change road sign in the next round of iterative search operation under a condition that one update time having a corresponding relationship with the before-change road sign in the next round of iterative search operation is found and the update time found is later than the current update time, the current update time being the update time having a corresponding relationship with the before-change road sign in the next round of iterative search operation in the current before-change road sign list.

In some embodiments, the apparatus for updating associated information of the guide point utilizes the following modes to implement the process of searching the update time corresponding to the before-change road sign in the next round of iterative search operation in the road change time library:

determining a target update time closest to the current update time in the plurality of update times under a condition that the plurality of update times having a corresponding relationship with the before-change road sign in the next round of iterative search operation and later than the current update time are found, and determining the target update time as the update time having a corresponding relationship with the before-change road sign in the next round of iterative search operation.

In some embodiments, the apparatus for updating associated information of the guide point utilizes the following mode to implement the process of repeatedly implementing a round of iterative search operation until a preset search ending condition is met:

determining that the search ending condition is met in a case that the current after-change road sign list is empty, and ending the plurality of rounds of iterative search operation.

In some embodiments, the apparatus for updating associated information of the guide point utilizes the following mode to implement the process of repeatedly implementing a round of iterative search operation until a preset search ending condition is met:

determining that the search ending condition is met under a condition that an $N^{th}$ round of iterative search operation is ended, and ending the plurality of rounds of iterative search operation, N being a positive integer greater than or equal to 2.

In some embodiments, the apparatus for updating associated information of the guide point is further configured to acquire the before-change road, and determine an after-change road obtained after the before-change road is changed under a condition that the before-change road is changed, and update the road change time library and the road change relationship library according to at least one of the road sign of the before-change road, the time at which the before-change road is changed or the road sign of the after-change road.

In some embodiments, the before-change road includes the first road; the time at which the before-change road is changed includes the first update time; the after-change road includes the second road; and the apparatus for updating associated information of the guide point is further configured to:

add the first update time and the first road sign which have a corresponding relationship in the road change time library, and add the first update time, the first road sign serving as the before-change road sign and a second road sign serving as the after-change road sign which have a corresponding relationship in the road change relationship library under a condition that the first road is changed into a second road at the first update time, the second road sign being the road sign of the second road.

In some embodiments, the before-change road includes the first road; the time at which the before-change road is changed includes the first update time; the after-change road includes the second road and the third road; and the apparatus for updating associated information of the guide point is further configured to:

add the first update time and the first road sign which have a corresponding relationship in the road change time library, add the first update time, the first road sign serving as the before-change road sign and the second road sign serving as the after-change road sign which have a corresponding relationship in the road change relationship library, and add the first update time, the first road sign serving as the before-change road sign and a third road sign serving as the after-change road sign which have a corresponding relationship in the road change relationship library under a condition that the first road is changed into the second road and a third road at the first update time, the third road sign being the road sign of the third road.

In some embodiments, the before-change road includes the first road and the second road; the time at which the before-change road is changed includes the first update time; the after-change road includes the third road; and the apparatus for updating associated information of the guide point is further configured to:

add the first update time and the first road sign which have a corresponding relationship in the road change time library, add the first update time and the second road sign which have a corresponding relationship in the road change time library, add the first update time, the first road sign serving as the before-change road sign and the second road sign serving as the after-change road sign which have a corresponding relationship in the road change relationship library, and add the first update time, the second road sign serving as the before-change road sign and the third road sign serving as the after-change road sign which have a corresponding relationship in the road change relationship library under a condition that the first road and the second road are changed into the third road at the first update time.

In some embodiments, the before-change road includes the first road; the time at which the before-change road is changed includes the first update time; the after-change road includes the first road and the second road; and the apparatus for updating associated information of the guide point is further configured to:

add the first update time and the first road sign which have a corresponding relationship in the road change time library, add the first update time, the first road sign serving as the before-change road sign and the first road sign serving as the after-change road sign which have a corresponding relationship in the road change relationship library, and add the first update time, the first road sign serving as the before-change road sign and the second road sign serving as the after-change road sign which have a corresponding relationship in the road change relationship library under a condition that the first road is changed into the first road and the second road at first update time, the second road sign being the road sign of the second road.

In some embodiments, the before-change road includes the first road and the second road; the time at which the before-change road is changed includes the first update time; the after-change road includes the first road; and the apparatus for updating associated information of the guide point is further configured to:

add the first update time and the first road sign which have a corresponding relationship and the first update time and the second road sign which have a corresponding relationship in the road change time library, add the first update time, the first road sign serving as the before-change road sign and the first road sign serving as the after-change road sign which have a corresponding relationship in the road change relationship library, and add the first update time, the second road sign serving as the before-change road sign and the first road sign serving as the after-change road sign which have a corresponding relationship in the road change relationship library under a condition that the first road and the second road are changed into the first road at the first update time.

In some embodiments, the apparatus for updating associated information of the guide point adopts the following modes to implement the process of updating the first road sign corresponding to the target guide point in the terminal device according to the set of after-change road signs:

determining a road closest to the target guide point in a set of roads represented by the set of after-change road signs as a target road; and updating a road sign corresponding to the target guide point from the first road sign to a target road sign, the target road sign being a road sign of the target road with the target guide point.

In some embodiments, the apparatus for updating associated information of the guide point is further configured to:

acquire a target point closest to the target guide point on the target road, the target point being a position point closest to the target guide point on the target road; and update coordinates of the target guide point to coordinates of the target point.

In some embodiments, the apparatus adopts the following modes to implement the process of determining the road closest to the target guide point in the set of roads represented by the set of after-change road signs as the target road:

acquiring coordinates of a set of road points on each road in the set of roads;

determining the position of each road according to the coordinates of the set of road points on each road, and determining the distance between each road and the target guide point according to the coordinates of the target guide point and the position of each road; and determining the road closest to the target guide point as the target road.

In one aspect, this application provides a computer program product, and the computer program product includes a computer program/instruction that contains a program code for executing the method shown in the flowchart. In such embodiment, the computer program can be downloaded and installed from the network via a communication section 1709, and/or installed from a removable medium 1711. Various functions provided by the embodiments of this application are performed when the computer program is executed by a central processing unit 1701.

The above-described embodiments of this application are only for description, but not to represent the advantages and disadvantages of the embodiments.

Figure 17:
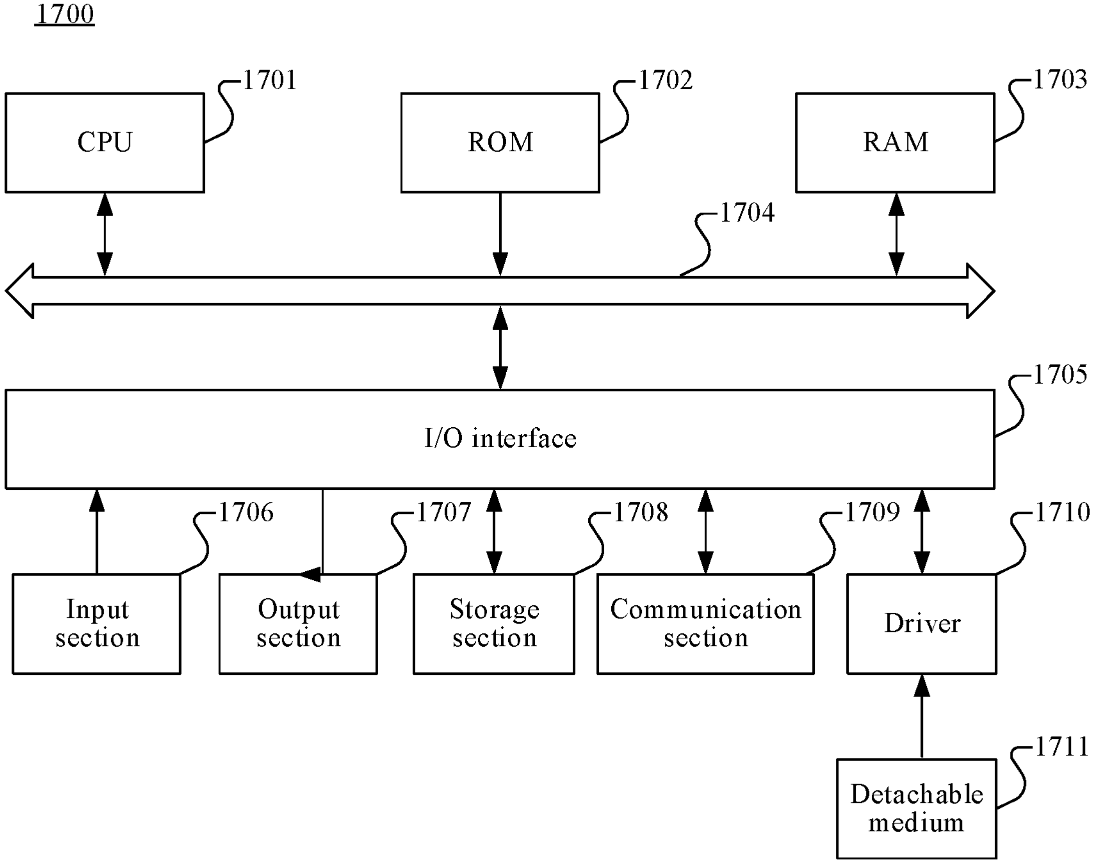
FIG. 17 is a structure schematic diagram of a exemplary product for updating associated information of a guide point according to an embodiment of this application.

FIG. 17 illustrates an architecture block diagram of a computer system for implementing an electronic device according to an embodiment of this application.

A computer system 1700 of the electronic device shown in FIG. 17 is only one example, not to impose any limitations on the functions and scope of use of the embodiments of this application.

As shown in FIG. 17, the computer system 1700 includes the central processing unit 1701 (CPU) which can execute various proper actions and processing according to a program stored in a read-only memory 1702 (ROM) or a program loaded from a storage part 1708 to a random access memory 1703 (RAM). Various programs and data required by system operation are also stored in the RAM 1703. The CPU 1701, the ROM 1702 and the RAM 1703 are connected with one another through a bus 1704. An input/output interface 1705 (I/O interface) is also connected to the bus 1704.

The following components are connected to the I/O interface 1705: an input section 1706 including a keyboard, a mouse, etc.; an output section 1707 including a cathode ray tube (CRT), a liquid crystal display (LCD), etc., and a speaker, etc.; a storage section 1708 including a hard disk, etc.; and a communication section 1709 including a network interface card such as a local area network card and a modem. The communication section 1709 performs communication processing via a network such as the Internet. A driver 1170 is also connected to the I/O interface 1705 as required. The removable medium 1711 such as a magnetic disk, an optical disk, a magneto-optical disk and a semiconductor memory is installed on the driver 1170 as required so that the computer program read therefrom can be installed in the storage section 1708 as required.

In particular, according to embodiments of this application, the processes described in various method flowcharts may be implemented as computer software programs. For example, this embodiment of this application includes a computer program product, the computer program product includes a computer program carried on the computer readable medium, and the computer program includes program code used for performing the methods shown in the flowcharts. In such embodiment, the computer program can be downloaded and installed from the network via a communication section 1709, and/or installed from a removable medium 1711. Various functions defined in the system of this application are performed when the computer program is executed by the CPU 1701.

Figure 18:
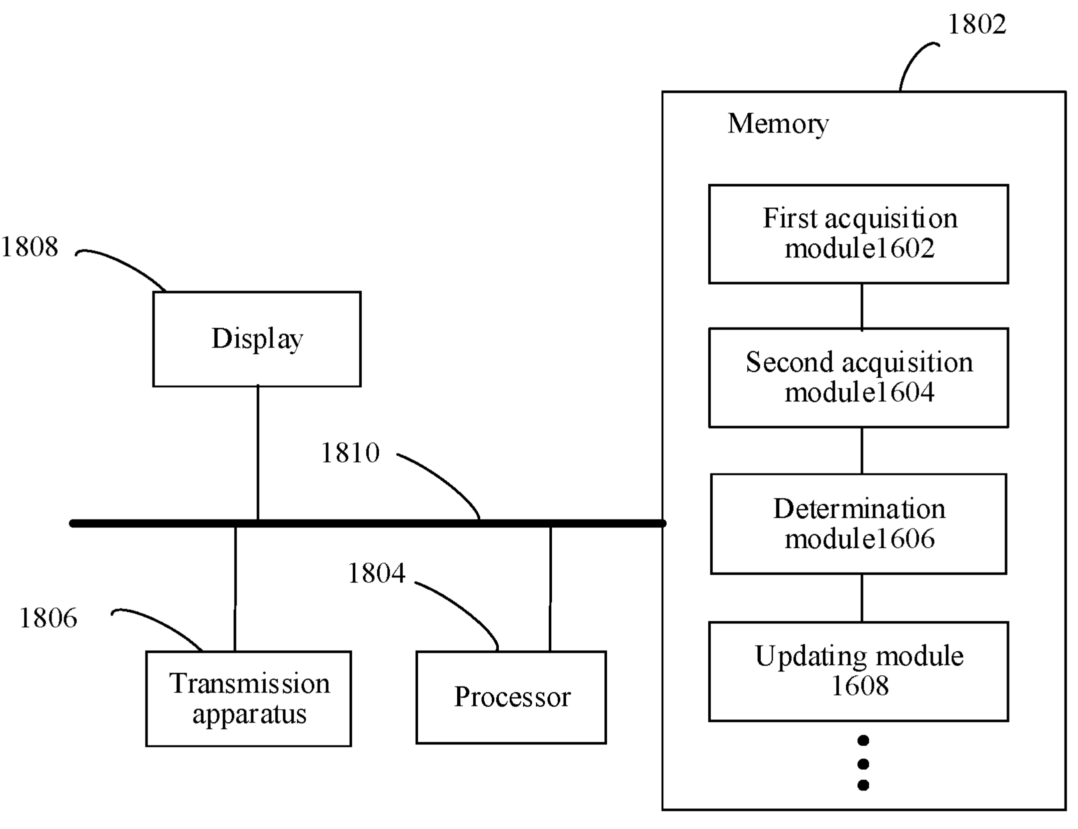
FIG. 18 is a structure schematic diagram of an exemplary electronic device according to an embodiment of this application.

In another aspect, the embodiment of this application further provides an electronic device for implementing the abovementioned method for updating associated information of the guide point. The electronic device can be a terminal device or a server shown in FIG. 1. The embodiment is described by taking the electronic device as the terminal device. As shown in FIG. 18, the electronic device includes a memory 1802 and a processor 1804; the computer program is stored in the memory 1802; and the processor 1804 is set to execute the steps in any method embodiment through the computer program.

In some embodiments, in this embodiment, the electronic device can be positioned in at least one network device in a plurality of network devices of the computer network.

In some embodiments, in this embodiment, the processor can be set to implement the following steps through the computer program:

S1, Acquire the first road sign corresponding to the target guide point, the first road sign being the road sign of the first road with the target guide point.

S2, Acquire the first update time having a corresponding relationship with the first road sign from the road change time library under the condition that the first road sign is found in the preset road change time library, the plurality of sets of update times and road signs which have a corresponding relationship being recorded in the road change time library, the road signs in the road change time library being configured to represent the roads with changes, the update time in the road change time library being the time at which the roads represented by the road signs having a corresponding relationship are changed, and the first update time being the earliest update time in the update times having a corresponding relationship with the first road sign in the road change time library.

S3, Determine a set of after-change road signs associated with the first update time and the first road sign in the preset road change relationship library, a plurality of sets of update times, before-change road signs and after-change road signs which have a corresponding relationship being recorded in the road change relationship library, the update time in the road change relationship library being the time at which the before-change road is changed to obtain the after-change road, the before-change road sign being configured to represent a before-change road, and the after-change road sign being configured to represent an after-change road.

S4, Update the first road sign corresponding to the target guide point according to the set of after-change road signs.

In some embodiments, a person of ordinary skill in the art may understand that, the structure shown in FIG. 18 is only schematic. The electronic device may be a terminal device such as a smart phone (such as an Android mobile phone or an iOS mobile phone), a tablet computer, a palmtop computer, a mobile Internet device (MID), or a PAD. FIG. 18 does not constitute a limitation on a structure of the foregoing electronic device of the electronic apparatus. For example, the electronic device of the electronic apparatus may further include more or less components (for example, a network interface) than those shown in FIG. 18, or has a configuration different from that shown in FIG. 18.

The memory 1802 can be configured to store software programs and modules, such as program instructions/modules corresponding to the method and the apparatus for updating associated information of the guide point in the embodiment of this application; and the processor 1804 executes various functional applications and data processing by running the software programs and the modules stored in the memory 1802, namely, the method for updating associated information of the guide point is implemented. The memory 1802 may include a high-speed random memory, and may also include a non-volatile memory, for example, one or more magnetic storage apparatuses, a flash memory, or another nonvolatile solid-state memory. In some embodiments, the memory 1802 may further include memories remotely disposed relative to the processor 1804, and the remote memories may be connected to a terminal through a network. Examples of the network include, but are not limited to, the Internet, an intranet, a local area network, a mobile communication network, and a combination thereof. The memory 1802 specifically can be but is not limited to be configured to store information such as map data. As an example, as shown in FIG. 18, the memory 1802 can be but is not limited to the first acquisition module 1602, the second acquisition module 1604, the determination module 1606 and the updating module 1608 in the apparatus for updating associated information of the guide point. In addition, it can also include but is not limited to other module units in the apparatus for updating associated information of the guide point, which are not repeated in the example.

In some embodiments, a transmission apparatus 1806 is configured to receive or transmit data through the network. The specific network examples can include a wired network and a wireless network. In one example, the transmission apparatus 1806 includes a network interface controller (NIC) which can be connected with other network devices and a router through network cables so as to communicate with the Internet or a local area network. In one example, the transmission apparatus 1806 is a radio frequency (RF) module which is configured to communicate with the Internet in a wireless mode.

In addition, the electronic device also includes a display 1808 configured to display the guide point and the road, and a connection bus 1810 configured to connect each module component in the electronic device.

In other embodiments, the terminal device or the server can be a node in a distributed system; the distributed system can be a block chain system, and the block chain system can be a distributed system formed by connecting a plurality of nodes in a network communication mode. The nodes can form a P2P (Peer To Peer) network; and any form of computing devices, such as the server, the terminal and other electronic devices, can become one node in the block chain system by joining the P2P network.

In one aspect, this application provides a computer readable storage medium, the processor of the computer device reads the computer instruction from the computer readable storage medium, and the processor executes the computer instruction, so that the computer device executes the method for updating associated information of the guide point provided in various selectable implementation modes in the aspect of updating the associated information of the guide point.

In some embodiments, in this embodiment, the computer readable storage medium can be set to store the computer program for implementing the following steps:

S1, Acquire the first road sign corresponding to the target guide point, the first road sign being the road sign of the first road with the target guide point.

S2, Acquire the first update time having a corresponding relationship with the first road sign from the road change time library under the condition that the first road sign is found in the preset road change time library, the plurality of sets of update times and road signs which have a corresponding relationship being recorded in the road change time library, the road signs in the road change time library being configured to represent the roads with changes, the update time in the road change time library being the time at which the roads represented by the road signs having a corresponding relationship are changed, and the first update time being the earliest update time in the update times having a corresponding relationship with the first road sign in the road change time library.

S3, Determine a set of after-change road signs associated with the first update time and the first road sign in the preset road change relationship library, a plurality of sets of update times, before-change road signs and after-change road signs which have a corresponding relationship being recorded in the road change relationship library, the update time in the road change relationship library being the time at which the before-change road is changed to obtain the after-change road, the before-change road sign being configured to represent a before-change road, and the after-change road sign being configured to represent an after-change road.

S4, Update the first road sign corresponding to the target guide point according to the set of after-change road signs.

In some embodiments, in this embodiment, a person of ordinary skill in the art can understand that, all or some steps in the methods in the foregoing embodiments may be performed by a program instructing related hardware of the terminal device. The program may be stored in the computer readable storage medium, and the storage medium includes: a flash drive, a Read-Only Memory (ROM), a Random Access Memory (RAM), a magnetic disk, an optical disc, and the like.

The above-described embodiments of this application are only for description, but not to represent the advantages and disadvantages of the embodiments.

When the integrated unit in the foregoing embodiments is implemented in a form of a software functional unit and sold or used as an independent product, the integrated unit may be stored in the foregoing computer readable storage medium. Based on such an understanding, the technical solutions of this application essentially, or a part contributing to the related art, or all or a part of the technical solution may be implemented in a form of a software product. The computer software product is stored in a storage medium and includes several instructions for instructing one or more computer devices (which may be a PC, a server, a network device or the like) to perform all or some of steps of the methods in the embodiments of this application.

In the foregoing embodiments of this application, the descriptions of the embodiments have respective focuses. For a part that is not described in detail in an embodiment, refer to related descriptions in other embodiments.

In the several embodiments provided in this application, it is to be understood that, the disclosed client may be implemented in another manner. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit. In this application, the term "module" and the term "unit" are used interchangeably.

What is claimed is:

1. A method for updating associated information of a guide point performed by an electronic device, the method comprising:

displaying, on the electronic device, a user interface of an application program, wherein the application program is configured to provide a navigation service and the user interface includes a map;

receiving, by the electronic device, a first user input specifying a target guide point on the user interface, the target guide point representing a position point on the map;

in response to receiving, by the electronic device, a second user input for performing navigation on the user interface, generating a navigation route on the map based on the target guide point, including:

acquiring a first road sign corresponding to the target guide point from a memory, the first road sign being a road sign of a first road with the target guide point;

acquiring a first update time having a corresponding relationship with the first road sign from a road change time library, the first update time being an earliest update time having a corresponding relationship with the first road sign in the road change time library;

determining a set of after-change road signs associated with the first update time and the first road sign in a preset road change relationship library, a plurality of sets of update times, before-change road signs and after-change road signs which have a corresponding relationship being recorded in the road change relationship library, each update time in the road change relationship library being a time at which a road corresponding to a before-change road sign is changed to obtain a road corresponding to a corresponding after-change road sign;

updating the first road sign corresponding to the target guide point in the memory according to the set of after-change road signs, including:

determining a road closest to the target guide point in a set of roads represented by the set of after-change road signs as a target road; and updating a road sign corresponding to the target guide point from the first road sign to a target road sign, the target road sign being a road sign of the target road with the target guide point; and updating the user interface of the application program associated with the electronic device, including displaying the navigation route on the map, wherein the navigation route includes the target guide point, at least a portion of the target road, and the target road sign.

2. The method according to claim 1, wherein the determining the set of after-change road signs associated with the first update time and the first road sign in the preset road change relationship library comprises:

taking the first update time and the first road sign as initial values to execute a plurality of rounds of iterative search operations in the road change relationship library so as to obtain the set of after-change road signs, the after-change road signs found in the previous round of iterative search operation being used as the before-change road signs in a next round of iterative search operation during the plurality of rounds of iterative search operations.

3. The method according to claim 1, further comprising:

acquiring a before-change road, and determining an after-change road obtained after the before-change road is changed under a condition that the before-change road is changed; and updating the road change time library and the road change relationship library according to at least one of a road sign of the before-change road, the time at which the before-change road is changed or a road sign of the after-change road.

4. The method according to claim 1, wherein the before-change road comprises the first road and a second road; the time at which the before-change road is changed comprises the first update time; the after-change road comprises the first road; and updating the road change time library and the road change relationship library according to at least one of a road sign of the before-change road, the time at which the before-change road is changed or a road sign of the after-change road comprises:

adding the first update time and the first road sign which have a corresponding relationship and the first update time and a second road sign which have a corresponding relationship in the road change time library, adding the first update time, the first road sign serving as the before-change road sign and the first road sign serving as the after-change road sign which have a corresponding relationship in the road change relationship library, and adding the first update time, the second road sign serving as the before-change road sign and the first road sign serving as the after-change road sign in the road change relationship library which have a corresponding relationship under a condition that the first road and the second road are changed into a third road with the first road sign at the first update time.

5. The method according to claim 1, further comprising:

acquiring a target point closest to the target guide point on the target road, the target point being a position point closest to the target guide point on the target road; and updating coordinates of the target guide point to coordinates of the target point.

6. The method according to claim 1, wherein the determining the road closest to the target guide point in a set of roads represented by the set of after-change road signs as the target road comprises:

acquiring coordinates of a set of road points on each road in the set of roads;

determining the position of each road according to the coordinates of the set of road points on each road, and determining a distance between each road and the target guide point according to the coordinates of the target guide point and a position of each road; and determining the road closest to the target guide point as the target road.

7. An electronic device, comprising one or more memories and one or more processors, the one or more memories storing at least one computer program that, when executed by the one or more processors, causes the electronic device to implement a method for updating associated information of a guide point, the method including:

displaying, on the electronic device, a user interface of an application program, wherein the application program is configured to provide a navigation service and the user interface includes a map;

receiving, by the electronic device, a first user input specifying a target guide point on the user interface, the target guide point representing a position point on the map;

in response to receiving, by the electronic device, a second user input for performing navigation on the user interface, generating a navigation route on the map based on the target guide point, including;

acquiring a first road sign corresponding to the target guide point from a memory, the first road sign being a road sign of a first road with the target guide point;

acquiring a first update time having a corresponding relationship with the first road sign from a road change time library, the first update time being an earliest update time having a corresponding relationship with the first road sign in the road change time library;

determining a set of after-change road signs associated with the first update time and the first road sign in a preset road change relationship library, a plurality of sets of update times, before-change road signs and after-change road signs which have a corresponding relationship being recorded in the road change relationship library, each update time in the road change relationship library being a time at which a road corresponding to a before-change road sign is changed to obtain a road corresponding to a corresponding after-change road sign;

updating the first road sign corresponding to the target guide point in the memory according to the set of after-change road signs, including:

determining a road closest to the target guide point in a set of roads represented by the set of after-change road signs as a target road; and updating a road sign corresponding to the target guide point from the first road sign to a target road sign, the target road sign being a road sign of the target road with the target guide point; and updating the user interface of the application program associated with the electronic device, including displaying the navigation route on the map, wherein the navigation route includes the target guide point, at least a portion of the target road, and the target road sign.

8. The electronic device according to claim 7, wherein the determining the set of after-change road signs associated with the first update time and the first road sign in the preset road change relationship library comprises:

taking the first update time and the first road sign as initial values to execute a plurality of rounds of iterative search operations in the road change relationship library so as to obtain the set of after-change road signs, the after-change road signs found in the previous round of iterative search operation being used as the before-change road signs in a next round of iterative search operation during the plurality of rounds of iterative search operations.

9. The electronic device according to claim 7, wherein the method further comprises:

acquiring a before-change road, and determining an after-change road obtained after the before-change road is changed under a condition that the before-change road is changed; and updating the road change time library and the road change relationship library according to at least one of a road sign of the before-change road, the time at which the before-change road is changed or a road sign of the after-change road.

10. The electronic device according to claim 7, wherein the before-change road comprises the first road and a second road; the time at which the before-change road is changed comprises the first update time; the after-change road comprises the first road; and updating the road change time library and the road change relationship library according to at least one of a road sign of the before-change road, the time at which the before-change road is changed or a road sign of the after-change road comprises:

adding the first update time and the first road sign which have a corresponding relationship and the first update time and a second road sign which have a corresponding relationship in the road change time library, adding the first update time, the first road sign serving as the before-change road sign and the first road sign serving as the after-change road sign which have a corresponding relationship in the road change relationship library, and adding the first update time, the second road sign serving as the before-change road sign and the first road sign serving as the after-change road sign in the road change relationship library which have a corresponding relationship under a condition that the first road and the second road are changed into a third road with the first road sign at the first update time.

11. The electronic device according to claim 7, wherein the method further comprises:

acquiring a target point closest to the target guide point on the target road, the target point being a position point closest to the target guide point on the target road; and updating coordinates of the target guide point to coordinates of the target point.

12. The electronic device according to claim 7, wherein the determining the road closest to the target guide point in a set of roads represented by the set of after-change road signs as the target road comprises:

acquiring coordinates of a set of road points on each road in the set of roads;

determining the position of each road according to the coordinates of the set of road points on each road, and determining a distance between each road and the target guide point according to the coordinates of the target guide point and a position of each road; and determining the road closest to the target guide point as the target road.

13. A non-transitory computer readable storage medium, storing at least one computer program that, when executed by a processor of an electronic device, causes the electronic device to implement a method for updating associated information of a guide point, the method including:

displaying, on the electronic device, a user interface of an application program, wherein the application program is configured to provide a navigation service and the user interface includes a map;

receiving, by the electronic device, a first user input specifying a target guide point on the user interface, the target guide point representing a position point on the map;

in response to receiving, by the electronic device, a second user input for performing navigation on the user interface, generating a navigation route on the map based on the target guide point, including:

acquiring a first road sign corresponding to the target guide point from a memory, the first road sign being a road sign of a first road with the target guide point;

acquiring a first update time having a corresponding relationship with the first road sign from a road change time library, the first update time being an earliest update time having a corresponding relationship with the first road sign in the road change time library;

determining a set of after-change road signs associated with the first update time and the first road sign in a preset road change relationship library, a plurality of sets of update times, before-change road signs and after-change road signs which have a corresponding relationship being recorded in the road change relationship library, each update time in the road change relationship library being a time at which a road corresponding to a before-change road sign is changed to obtain a road corresponding to a corresponding after-change road sign;

updating the first road sign corresponding to the target guide point in the memory according to the set of after-change road signs, including:

determining a road closest to the target guide point in a set of roads represented by the set of after-change road signs as a target road; and updating a road sign corresponding to the target guide point from the first road sign to a target road sign, the target road sign being a road sign of the target road with the target guide point; and updating the user interface of the application program associated with the electronic device, including displaying the navigation route on the map, wherein the navigation route includes the target guide point, at least a portion of the target road, and the target road sign.

14. The non-transitory computer readable storage medium according to claim 13, wherein the determining the set of after-change road signs associated with the first update time and the first road sign in the preset road change relationship library comprises:

taking the first update time and the first road sign as initial values to execute a plurality of rounds of iterative search operations in the road change relationship library so as to obtain the set of after-change road signs, the after-change road signs found in the previous round of iterative search operation being used as the before-change road signs in a next round of iterative search operation during the plurality of rounds of iterative search operations.

15. The non-transitory computer readable storage medium according to claim 13, wherein the method further comprises:

acquiring a before-change road, and determining an after-change road obtained after the before-change road is changed under a condition that the before-change road is changed; and updating the road change time library and the road change relationship library according to at least one of a road sign of the before-change road, the time at which the before-change road is changed or a road sign of the after-change road.

16. The non-transitory computer readable storage medium according to claim 13, wherein the method further comprises:

acquiring a target point closest to the target guide point on the target road, the target point being a position point closest to the target guide point on the target road; and updating coordinates of the target guide point to coordinates of the target point.

17. The non-transitory computer readable storage medium according to claim 13, wherein the determining the road closest to the target guide point in a set of roads represented by the set of after-change road signs as the target road comprises:

acquiring coordinates of a set of road points on each road in the set of roads;

determining the position of each road according to the coordinates of the set of road points on each road, and determining a distance between each road and the target guide point according to the coordinates of the target guide point and a position of each road; and determining the road closest to the target guide point as the target road.

* * * * *